(12) United States Patent
Nagarajan et al.

(10) Patent No.: US 8,081,332 B2
(45) Date of Patent: Dec. 20, 2011

(54) SYSTEMS AND METHODS FOR SECURE FAX AND SCAN TRANSMISSION STATUS NOTIFICATION

(75) Inventors: Ramesh Nagarajan, Pittsford, NY (US); Louis Ba La, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1294 days.

(21) Appl. No.: 11/730,913

(22) Filed: Apr. 4, 2007

(65) Prior Publication Data
US 2008/0007791 A1    Jan. 10, 2008

Related U.S. Application Data

(63) Continuation-in-part of application No. 11/482,895, filed on Jul. 10, 2006, now abandoned.

(51) Int. Cl.
G06F 3/12 (2006.01)
G06K 15/00 (2006.01)
H04N 1/00 (2006.01)

(52) U.S. Cl. ....... 358/1.15; 358/1.14; 358/405; 358/437

(58) Field of Classification Search ................. 358/1.15, 358/405, 437, 1.14
See application file for complete search history.

(56) References Cited

U.S. PATENT DOCUMENTS

| | | | |
|---|---|---|---|
| 5,784,177 A | 7/1998 | Sanchez et al. | |
| 5,920,404 A | 7/1999 | Weiser | |
| 6,020,980 A | 2/2000 | Freeman | |
| 6,023,345 A | 2/2000 | Bloomfield | |
| 6,101,244 A | 8/2000 | Okada | |
| 6,130,760 A | 10/2000 | Nickerson | |
| 6,477,243 B1 | 11/2002 | Choksi et al. | |
| 6,583,888 B1 | 6/2003 | Salgado et al. | |
| 6,825,947 B1 | 11/2004 | Asai | |
| 7,031,003 B2 * | 4/2006 | Nagai et al. | 358/1.13 |
| 2001/0024522 A1 * | 9/2001 | Nakao | 382/232 |
| 2001/0030762 A1 * | 10/2001 | Shibata et al. | 358/1.9 |
| 2002/0048048 A1 | 4/2002 | Kagawa | |
| 2002/0156923 A1 | 10/2002 | Tanimoto | |
| 2003/0101236 A1 * | 5/2003 | Ohara | 709/218 |
| 2004/0114195 A1 | 6/2004 | Ebner et al. | |
| 2004/0252348 A1 | 12/2004 | Desai | |
| 2005/0166155 A1 * | 7/2005 | Bridges et al. | 715/752 |
| 2005/0195425 A1 * | 9/2005 | Bridges et al. | 358/1.15 |
| 2006/0238822 A1 | 10/2006 | Van Hoof | |
| 2006/0239245 A1 | 10/2006 | Van Hoof | |
| 2007/0002391 A1 | 1/2007 | Nagarajan et al. | |
| 2008/0007791 A1 | 1/2008 | Nagarajan et al. | |

\* cited by examiner

*Primary Examiner* — Charlotte M Baker
*Assistant Examiner* — Fred Guillermety
(74) *Attorney, Agent, or Firm* — Pillsbury Winthrop Shaw Pittman LLP

(57) ABSTRACT

The presently disclosed embodiments are directed to systems and methods for transmitting a secure electronic fax or scan transmission report for a fax or scan job from a fax capable printer or a multifunctional device respectively. When the electronic confirmation (EConfirmation) option is selected, the machine sends an email comprising a status of the fax or scan job to the sender and a hyperlink. The sender then selects or "clicks" on the hyperlink, which connects to the machine Web (UI) Services. Web services automatically retrieves the job information and correctly displays all previously entered selections. The sender then simply verifies the information, makes any necessary changes and selects or "clicks" a button on the Web services to retransmit the fax or scan documents. In another embodiment, the sender is given an option to reformat a scan job by compressing or changing job parameters of the scan job. A method is also provided to automatically reformat the scan job and retransmit the reformatted scan job over the network if the transmission fails due to insufficient storage requirements and/or file size limitations at the destination.

25 Claims, 17 Drawing Sheets

SYSTEMS AND METHODS FOR SECURE FAX AND SCAN TRANSMISSION STATUS NOTIFICATION

This is a continuation-in-part of U.S. patent application Ser. No. 11/482,895, filed Jul. 10, 2006, entitled "Systems and Methods for Secure Fax Transmission Status Notification," and herein incorporated by reference.

TECHNICAL FIELD

Aspects of the present invention are directed to systems and methods for secure transmission status notification, such as for a fax job, a scan job, or other data transfer job.

Other aspects of the present application are directed to a method for automatically reformatting a scan job and retransmitting the reformatted scan job over the network if the transmission fails due to insufficient storage requirements and/or file size limitations at the destination.

DESCRIPTION OF RELATED ART

Conventionally, a fax capable printer prints out a Fax Transmission Report page for each fax job. The fax transmission report page, for example, shows the status of the fax transmission and provides a copy of the first page of the fax job. Even though printing a fax transmission report page provides adequate feedback to a user, it is often inefficient and inconvenient. In addition, printing a fax transmission report page can result in several management issues, including the issue of confidentiality.

A fax capable printer can take as much time as three to five minutes to print out a fax transmission report. Waiting by a printer for three to five minutes for a fax transmission report page is not an efficient use of time for many users. As a result, these users usually walk away from the machine to carry on other business and check for the fax transmission report page sometime later.

This method of obtaining fax transmission notification is inconvenient and can even result in missed deadlines for important faxes. Not all fax jobs are successfully transmitted on the first attempt. Consequently, a user who has left the fax capable printer sometimes returns to find a fax transmission report page reporting that the transmission of fax job has failed. If the deadline for receiving this failed fax job has passed, this notification method can also be costly to a business.

Finally, printing a fax transmission report page that contains information about the fax job can expose sensitive or confidential information to anyone with access to the fax capable printer. For example, some employee benefit service providers, like flexible medical spending account managers, require employees to fax paperwork to them without a cover sheet. If a fax transmission report page prints the first page of a flexible spending account form, it can expose highly confidential information such as an employee's social security number, full name, home address, date of birth, and signed signature. Such highly confidential information is all that is needed for someone to commit identity theft.

Scanning is becoming more prevalent in office environments today and many users are starting to heavily use the scanning capabilities of multifunctional devices (MFD). A MFD is a device having multiple capabilities, such as scanning, printing, copying and/or faxing. The MFD can be linked to a network for importing and exporting various files. See, for example, U.S. Pat. No. 6,583,888, herein incorporated by reference. For example, exporting scan jobs from the MFD is referred to as "scan2export." In particular, when the scan job is exported via email it is referred to as "scan2email," and when the scan job is exported to a network file storage destination it is referred to as "scan2file."

Conventionally, a MFD prints out a Scan Transmission Report page for each scan job, which details the status of the transmission. The scan transmission report page, for example, shows the status of the scan transmission and provides a copy of the first page of the scan job. Even though printing a scan transmission report page provides adequate feedback to a user, it is often inefficient and inconvenient. In addition, printing a scan transmission report page can result in several management issues, similar to those noted above with respect to faxing, including the issue of confidentiality.

In today's MFDs usage, the entire job is scanned into memory. All the necessary post-processing and compression are performed and finally at the time of transfer to the destination, the failure is identified and an error page is printed at the MFD. The MFD can take as much time as three to five minutes to print out a scan transmission page, which presents issues similar to those noted above for fax jobs. This waiting period gets even worse in heavy duty scan application sites since the necessary post processing and transfer is put into a queue until all scanning is complete at the machine. As a result, these users usually walk away from the machine to carry on other business and check for the scan transmission report page sometime later.

This method of obtaining scan transmission notification is inconvenient and can even result in missed deadlines for important scan jobs. Not all scan jobs are successfully transmitted on the first attempt. Consequently, a user who has left the MFD sometimes returns to find a scan transmission report page reporting that the transmission of scan job has failed. If the deadline for receiving this failed scan job has passed, this notification method can also be costly to a business.

Finally, just as with faxing, printing a scan transmission report page that contains information about the scan job can expose sensitive or confidential information to anyone with access to the MFD.

The feedback to the users when exporting scan jobs has not been quite favorable for MFDs. For example, if the programmed network destination of the scan job were either invalid or full (i.e., with no space available to store images), then the transmission will be rejected by the network destination resulting in a failed transmission. Also, many times the destination email addresses may be incorrectly specified or may have changed, which also may result in a failed transmission.

This is quite a frustrating experience for the user since he or she has wasted time scanning the entire job. In some cases, the user might have even walked away from the MFD thinking that the job was successful, only to find out later that the job failed or was cancelled. It would be useful for the user to know this feedback as soon as possible.

U.S. patent application Ser. No. 11/170,490 (U.S. Patent Application Publication Pub. No. 2007-0002391), entitled "Data Transferability Predicator," and herein incorporated by reference, proposed a method to query the destination for the available storage space based on a compression ratio predictor that estimates the size of the "scan2export" job. The success rate of this technique is heavily dependent on the accuracy of the compression ratio predictor and therefore is limited in its effectiveness. Also, this method did not provide an easy approach to reformat the document for improving the file size once it was scanned. It required the user to rescan the documents with a different set of parameters.

SUMMARY

A first embodiment is a method for electronically transmitting a fax transmission report for a fax job from a fax capable printer. An email address is received. A recipient fax destination address is received. The document is scanned and an electronic representation of the document is transmitted to the recipient fax destination address as a fax job. The fax transmission report is generated. The fax transmission report includes the status of the fax job. An email including the fax transmission report or a link thereto is transmitted to the email address.

Another embodiment is a system for electronically transmitting a fax transmission report for a fax job from a fax capable printer. The system includes a user interface, a fax service, an email service, and a job manager. The user interface, fax service, email service, and job manager are software components that are executed on one or more processors of the fax capable printer. The user interface receives an email address, receives a recipient fax destination address, and receives a signal to fax a document. The job manager receives the email address, the recipient fax destination address, and the signal to fax the document from the user interface. The job manager transmits the document to the recipient fax destination address as a fax job by sending the recipient fax destination address to the fax service. The job manager monitors the fax service for the status of the fax job. The job manager generates the fax transmission report. The fax transmission report includes the status of the fax job. The job manager transmits an email, which includes the fax transmission report or a link thereto, to the email address by sending the email address and the fax transmission report or the link thereto to the email service. For example, sending the email comprising the status of the fax job may comprises at least one of: (a) embedding the fax transmission report in the body of the email; (b) attaching the fax transmission report as an attachment to the email; and (c) embedding a link to the fax transmission report in the body of the email.

A further embodiment is a method for storing a fax job on a fax capable printer. A recipient fax destination address is received. A first signal to save the fax job is received. A second signal to fax a document is received. The document is transmitted to the recipient fax destination address as a fax job. Transmitting the document to the recipient fax destination address includes creating a scanned image of the document and storing the recipient fax destination address, the scanned image, and a status of the transmitting the document as a fax job in a memory for the fax capable printer.

A second embodiment is a method for electronically transmitting a scan transmission report for a scan job from a MFD. An email address is received. A recipient scan number is received. The document is scanned and an electronic representation of the document is transmitted to the scan destination address as a scan job. The scan transmission report is generated. The scan transmission report includes the status of the scan job. An email including the scan transmission report or the link thereto is transmitted to the email address.

A further embodiment is a system for electronically transmitting a scan transmission report for a scan job from a MFD. The system includes a user interface, a scan service, an email service, file transfer service, and a job manager. The user interface, scan service, email service, file transfer service, and job manager are software components that are executed on one or more processors of the MFD. The user interface receives an email address, receives a scan destination address, and receives a signal to scan a document. The job manager receives the email address, the scan destination address, and the signal to scan the document from the user interface. The job manager transmits the document to the scan destination address as a scan job. The job manager monitors the scan service for the status of the scan job. The job manager generates the scan transmission report. The scan transmission report includes the status of the scan job. The job manager transmits an email, which includes the scan transmission report or a link thereto, to the email address by sending the email address and the scan transmission report or the link thereto to the email service. For example, sending the email comprising the status of the scan job may comprises at least one of: (a) embedding the scan transmission report in the body of the email; (b) attaching the scan transmission report as an attachment to the email; and (c) embedding a link to the scan transmission report in the body of the email.

Another embodiment is a method for storing a scan job on a MFD. A scan destination address is received. A first signal to save the scan job is received. A second signal to scan a document is received. The document is transmitted to the scan destination address as a scan job. Transmitting the document to the recipient scan destination includes creating a scanned image of the document and storing the recipient scan destination, the scanned image, and a status of the transmitting the document as a scan job in a memory of the MFD.

A third embodiment is a method for automatically reformatting and retransmitting a scan job if the scan job failed due to insufficient storage space and/or file size transfer limitations. The scan job will be reformatted in order to reduce or compress the scan imaged data. A counter is associated to monitor and control the number of retransmission attempts are made.

Other objects, features, and advantages of the present application will become apparent from the following detailed description, the accompanying drawings, and the appended claims.

Figure 1:
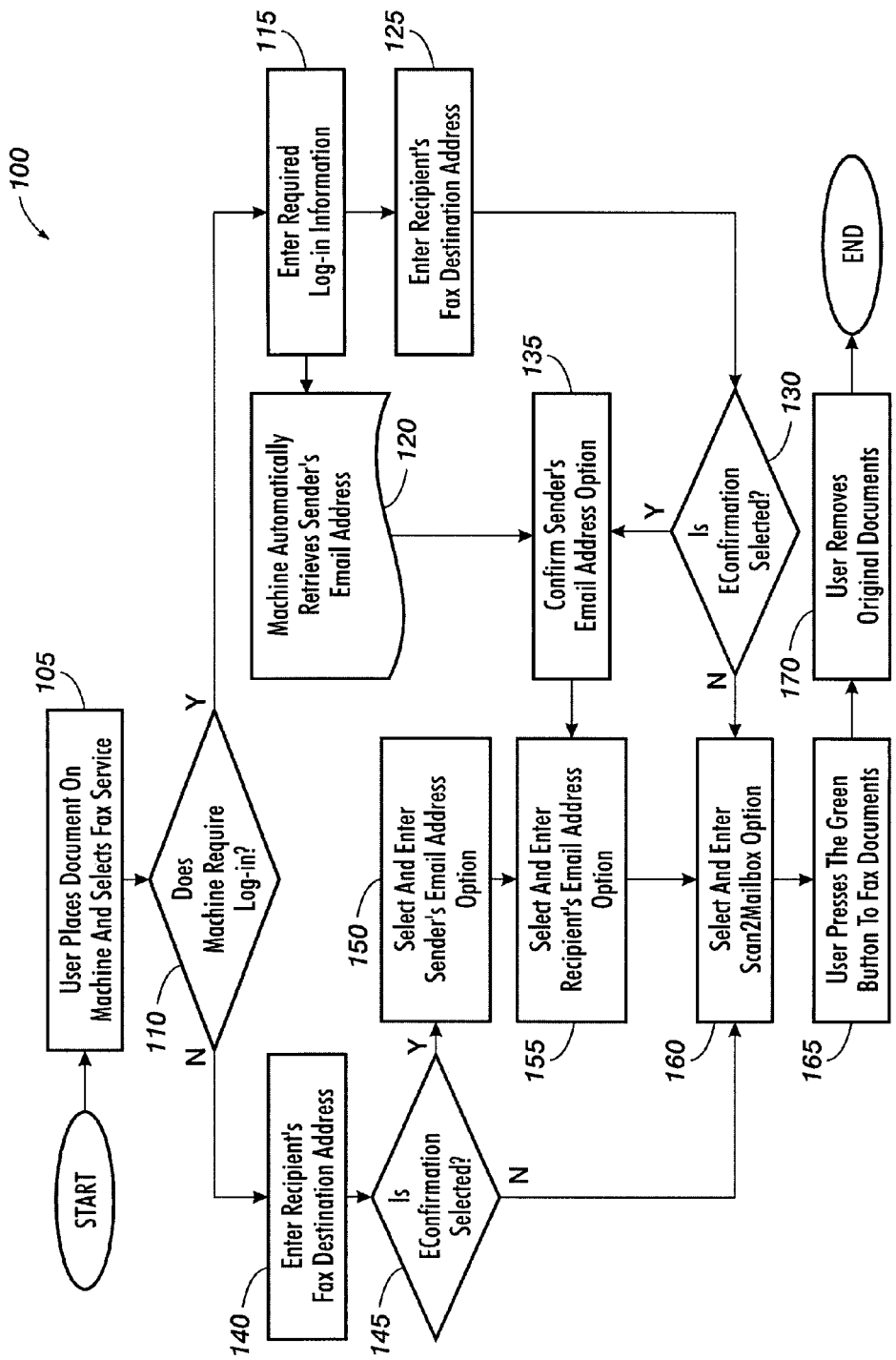
FIG. 1 is a flowchart showing a method for faxing documents, in accordance with an embodiment.

Before one or more embodiments are described in detail, one skilled in the art will appreciate that an embodiment is not limited in its application to the details of construction, the arrangements of components, and the arrangement of steps set forth in the following detailed description or illustrated in the drawings. An embodiment is capable of being practiced or being carried out in various ways. Also, it is to be understood that the phraseology and terminology used herein is for the purpose of description and should not be regarded as limiting.

DETAILED DESCRIPTION

The term "printer" as used herein encompasses any apparatus, such as a digital copier, bookmaking machine, facsimile machine, multifunctional device, etc. which performs a print outputting function for any purpose. A "fax" or "facsimile" may be defined as an arrangement by which data relating to an image is sent through an electronic system, such as wire telephone, cell-phone system, or combination of aspects thereof, also generally usable for transmission of data relating to sound. The term "fax capable printer" refers to a device that has the capability to (a) print as a printer, and (b) scan a document into digital format and transmit the data in analog or digital format (including the raw scanned data or compressed data) to a remote location, such as by an analog (e.g., telephone line) or digital (e.g., the Internet) communication system. Typically, in the context of a typical fax machine, only the confirmation page is printed, but this still qualifies as a print capability (and fax capable printers with receive capability may used the printing device to print entire received faxes). Embodiments disclosed herein may be practiced in other systems with both fax and print capabilities.

The term "multifunctional device," or "MFD" as used herein encompasses any device that has the capability to at least (a) scan a document into electronic image data; and (b) transmit the data over a network (e.g., a WAN, LAN, Intranet, the Internet, etc.). Embodiments disclosed herein may be practiced in other systems that have scanning and networking capabilities. Further, the multifunctional device, may provide additional capabilities, such as printing, copying and/or faxing.

The term "email," also known as "electronic mail," as used herein encompasses any transmission of digital data via a system including a digital address. Email may include transmissions such as via a POP-3 server or equivalent technology. An email may include any electronically sent message, and may include conventional emails and other messaging such as instant messaging or text messaging. The term "email enabled device" may include any device with the capability to send and/or receive email. An emailed enabled device can include, but is not limited to, a computer, a cellular phone, and a personal digital assistant.

In one embodiment, an electronic notification is sent from a fax capable printer after a successful or failed fax transmission. When preparing to fax the document, a user enters an email address on the same user interface and in the same vicinity as the user enters a recipient fax destination address. The email address is the email address of the user or the email address of the recipient. The user can optionally enable or disable the printing of a fax transmission report page by the fax capable printer. The user can also optionally select or deselect an auto retry option to be applied if the initial fax transmission fails.

After entering the selections, the user initiates the fax transmission. The fax transmission is initiated by depressing a button on the fax capable printer, for example. The fax capable printer then monitors the fax job for a status and generates a fax transmission report. The fax transmission report may be stored locally in the memory for the fax capable printer. The status of the fax job, e.g., the fax transmission report or a hyper-link thereto, is emailed to the email address entered by the user. A recipient preferably receives the a fax transmission report or the link thereto via email only if the fax transmission was successful. An email to a recipient also preferably includes a brief, generic or personalized message that indicates to the recipient that a document is waiting at the recipient's fax machine. The fax transmission report is also printed by the fax capable printer depending on the option selected by the user.

FIG. 1 is a flowchart showing a method 100 for faxing documents, in accordance with an embodiment.

In step 105 of method 100, a user places a document on a fax capable printer and selects an option to fax the document. The selection is made from a user interface of the fax capable printer, for example. A user interface of the fax capable printer can include, but is not limited to, a display, a graphical user interface provided on a display, a keypad, and/or input buttons.

In step 110, it is determined if the fax capable printer requires login information.

In step 115, login information is obtained from the user, if the fax capable printer requires login information. Login information can include, but is not limited to, a user identification (ID) and password. The login information is entered by the user using a user interface of the fax capable printer, for example.

In step 120, an email address for the user is obtained from a database according to the login information entered by the user in step 115. The database can be located on the fax capable printer or accessed remotely via a network connected to the fax capable printer. Alternatively, the user may manually enter his/her email address as is done in step 150, discussed below.

In step 125, the recipient fax destination address is obtained from the user. The fax is being sent to the recipient.

The recipient fax destination address is entered by the user using a user interface of the fax capable printer, for example. The term "fax destination address" will typically be a telephone number associated with the remote destination (e.g., a fax receiving machine), where the fax is to be sent. It may also be an email or other type of electronic address. The term "fax destination address" may encompass all of these.

In step 130, it is determined if the user has selected the electronic notification or confirmation option. Electronic confirmation is called "EConfirmation," for example. The user selects electronic confirmation using a user interface of the fax capable printer, for example.

In step 135, the user is asked to confirm the email address obtained from the database in step 120, if electronic confirmation was selected by the user. The user confirms the email address using a user interface of the fax capable printer, for example. The user may also opt to alter the email address (e.g., if an assistant wants the confirmation to go to his/her boss) or add additional email addresses (e.g., multiple persons on a team may wish to know when an important document has been sent to satisfy a deadline).

Step 140 shows the progress of the method when the fax capable printer does not require login information. In step 140, the recipient fax destination address is obtained from the user. The recipient fax destination address (or multiple addresses) is entered by the user using a user interface of the fax capable printer, for example.

In step 145, it is determined if the user has selected the electronic confirmation option. The user selects electronic confirmation using a user interface of the fax capable printer, for example.

In step 150, an email address for the user (or any other address or addresses where the user wants the email routed) is obtained from the user, if the electronic confirmation option was selected by the user and an option to notify the user by email was selected by the user. The email address for the user is used to notify the user or his/her designee of the status of the fax transmission. The email address for the user is entered by the user using a user interface of the fax capable printer, for example.

In step 155, which may follow step 135 or step 150, an email address for the recipient is obtained from the user, if the electronic confirmation option was selected by the user and an option to notify the recipient by email was selected by the user. The email address for the recipient is used to notify the recipient of the status of the fax transmission. The email address for the recipient is entered by the user using a user interface of the fax capable printer, for example.

In step 160, a signal is received to store the fax job locally and its status on the fax capable printer, if the user selects the store fax job option. The store fax job locally option is called "Scan2Mailbox," for example. Preferably, in addition to storing the scanned image data, the optimal information for sending the electronic confirmation will be stored as well so that it need not be re-entered. The store fax job option is selected by the user using a user interface of the fax capable printer, for example. The store fax job locally option allows a user to return to the fax capable printer and resubmit the fax job without having to rescan the same documents. This is beneficial in the event the job fails to send, and avoids the need for re-scanning.

The fax job can also be stored locally in step 130 when a user selects electronic confirmation. Electronic confirmation allows the sender to resubmit the fax job without having to return to the fax capable printer.

In step 165, a signal is received to fax one or more documents and the one or more documents are faxed to the recipient fax destination address. The signal is obtained by the user pressing a button on the fax capable printer, for example. In another embodiment, the button is part of the user interface of the fax capable printer. In the drawings, the button for sending this signal is referred to as the green button, simply because green is a common color for a send button. Of course, the button may have any color, or any shape of configuration, and any form of input other than a button may be used.

In step 170, the user removes one or more documents from the fax capable printer.

Figure 2:
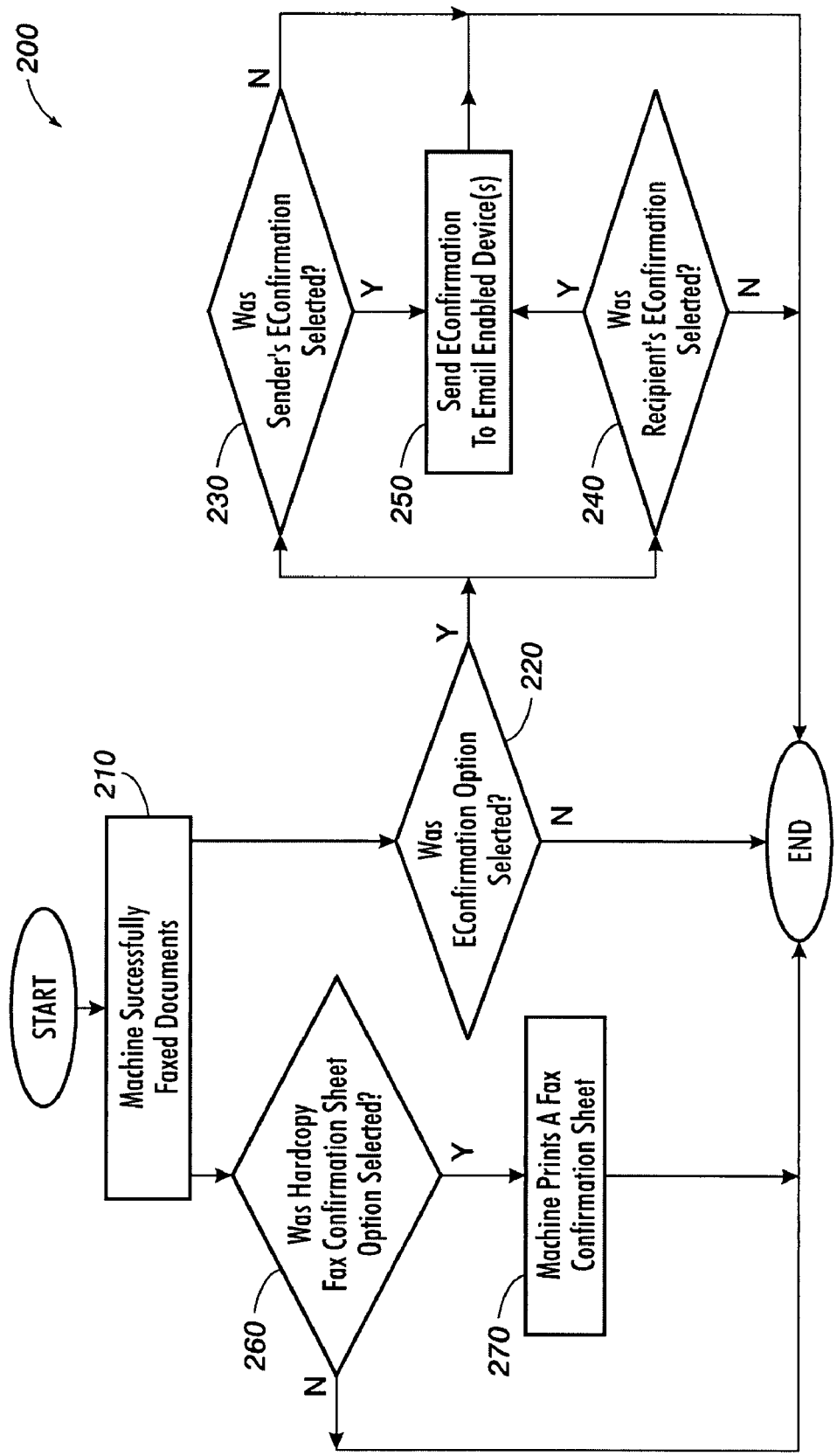
FIG. 2 is a flowchart showing a method for receiving confirmation of a fax transmission, in accordance with an embodiment.

FIG. 2 is a flowchart showing a method 200 for receiving confirmation of a fax transmission, in accordance with an embodiment.

In step 210 of method 200, a fax capable printer has successfully transmitted a fax.

In step 220, it is determined if the user has selected the electronic confirmation option.

In step 230, it is determined if the user selected sending an electronic confirmation to the sender or user. If the user selected sending an electronic confirmation to the sender, the user would have entered an email address for the user, or the email address would have been obtained from a database using login information.

In step 240, it is determined if the user selected sending an electronic confirmation to the recipient. If the user selected sending an electronic confirmation to the recipient, the user would have entered an email address for the recipient.

In step 250, an electronic confirmation is sent, if the user selected sending an electronic confirmation to the sender (or a designee) or if the user selected sending an electronic confirmation to the recipient. An electronic confirmation is sent to the user and the recipient, as applicable. The electronic confirmation can be received by the user or the recipient at any email enabled device. An emailed enabled device can include, but is not limited to, a computer, a cellular phone, and a personal digital assistant. An email may include any electronically sent message, and may include typical emails and other messaging such as instant messaging or text messaging.

In step 260, it is determined if the user selected printing a fax confirmation sheet, or a fax transmission report page, by the fax capable printer.

In step 270, the fax confirmation sheet is printed by the fax capable printer.

In another embodiment, the email that is sent to the email address also includes a link, hyper-link, or universal resource locator (URL), to the fax capable printer's Web server if the email address is the email address of the user. The link allows the user to run a Web service to retrieve the fax job status, and the fax job information, including all previously entered selections. A Web service can also allow the user to view the recipient fax destination address, edit the recipient fax destination address, retransmit the fax, or delete the fax job from the fax capable printer. The link is preferably included if the fax transmission failed. However, the link can also be sent if the fax transmission is successful. A user can decide to resend a successful fax to the same recipients or other recipients, for example.

In another embodiment, the link is included in an email sent to the email address of the recipient. However, a Web service providing retransmission of the fax is preferably not available to a recipient. A user or recipient accesses a link and executes a Web service using a Web browser.

Figure 3:
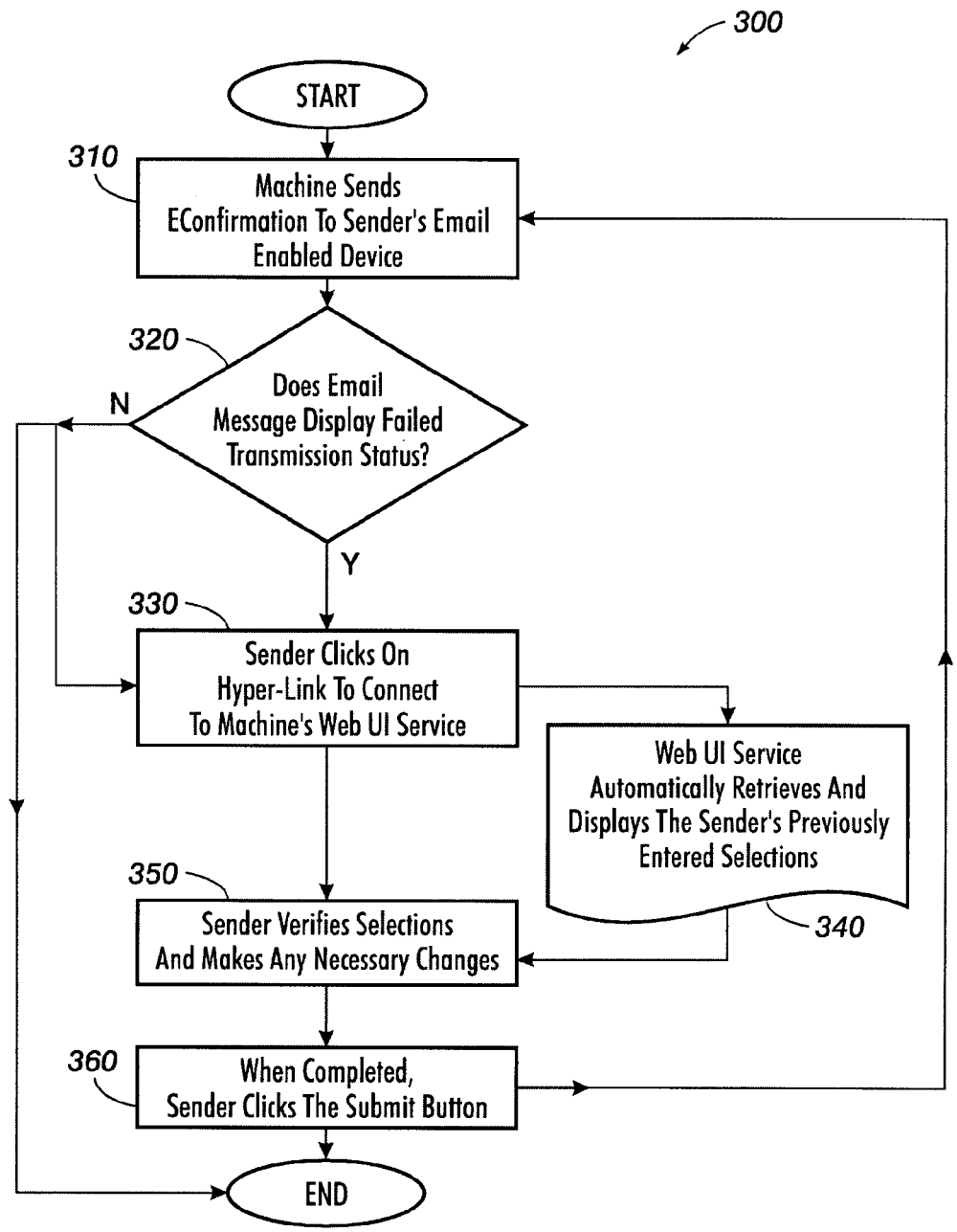
FIG. 3 is a flowchart showing a method for remotely retransmitting a fax using a Web service without having to rescan the same documents again, in accordance with an embodiment.

FIG. 3 is a flowchart showing a method 300 for remotely retransmitting a fax using a Web service without having to rescan the same document again, in accordance with an embodiment. The Web service is a user interface service, for example.

In step 310 of method 300, an electronic confirmation is sent to the user, or sender. The electronic confirmation is an email sent to an email address of the user. The electronic confirmation can be received by the user at any email enabled device. An email enabled device can include, but is not limited to, a computer, a cellular phone, and a personal digital assistant.

In step 320, it is determined if the fax transmission succeeded or failed. Preferably a link is only added to the email if the fax transmission has failed. In another embodiment, a link is added regardless of whether or not the fax transmission has failed.

In step 330, a link is added to the email and the user selects the link to connect to a Web service of the fax capable printer.

In step 340, a Web service automatically retrieves the fax job information, including selections previously entered by the user.

In step 350, the user verifies the fax job information and can edit the fax job information.

In step 360, the user initiates a retransmission of the fax job. If the fax job information has not been edited to remove the selection of an electronic confirmation, method 300 returns to step 310.

Another embodiment is a method of storing and recalling fax jobs on a fax capable printer. Prior to submitting a fax job, a user can select an option to store a scanned image of a faxed document in a memory for the fax capable printer. The memory for a fax capable computer can include, but is not limited to, the physical memory of the fax capable printer a database of the fax capable printer, or a memory on a network to which the fax capable printed is connected. The option of storing a scanned image can be selected with the electronic notification via email option or without the electronic notification via email option. When the option of storing a scanned image is selected, the user can return to the machine sometime later to query the status of the fax transmission. If the fax transmission fails for any reason, the user can easily retrieve the scanned image of the document from a memory of the fax capable printer without having to rescan the documents.

The memory for the fax capable printer containing the scanned image and other fax job information is called a "mailbox," for example. On retrieval of the fax job from the mailbox, the machine automatically displays all previously entered selections. This allows the user to quickly confirm all the information, make any necessary changes and re-submit the fax transmission. The option to store a scanned image of a faxed document increases the productivity of the user by removing the burden on the user to physically retrieve the original hard copy of the document. In addition, the option to store a scanned image of a faxed document frees the user from having to rescan the document all over again. Finally, option to store a scanned image of a faxed document is particular convenient for a user who works in a large and open setting, such as manufacturing floor, where access to email is inconvenient or difficult.

Figure 4:
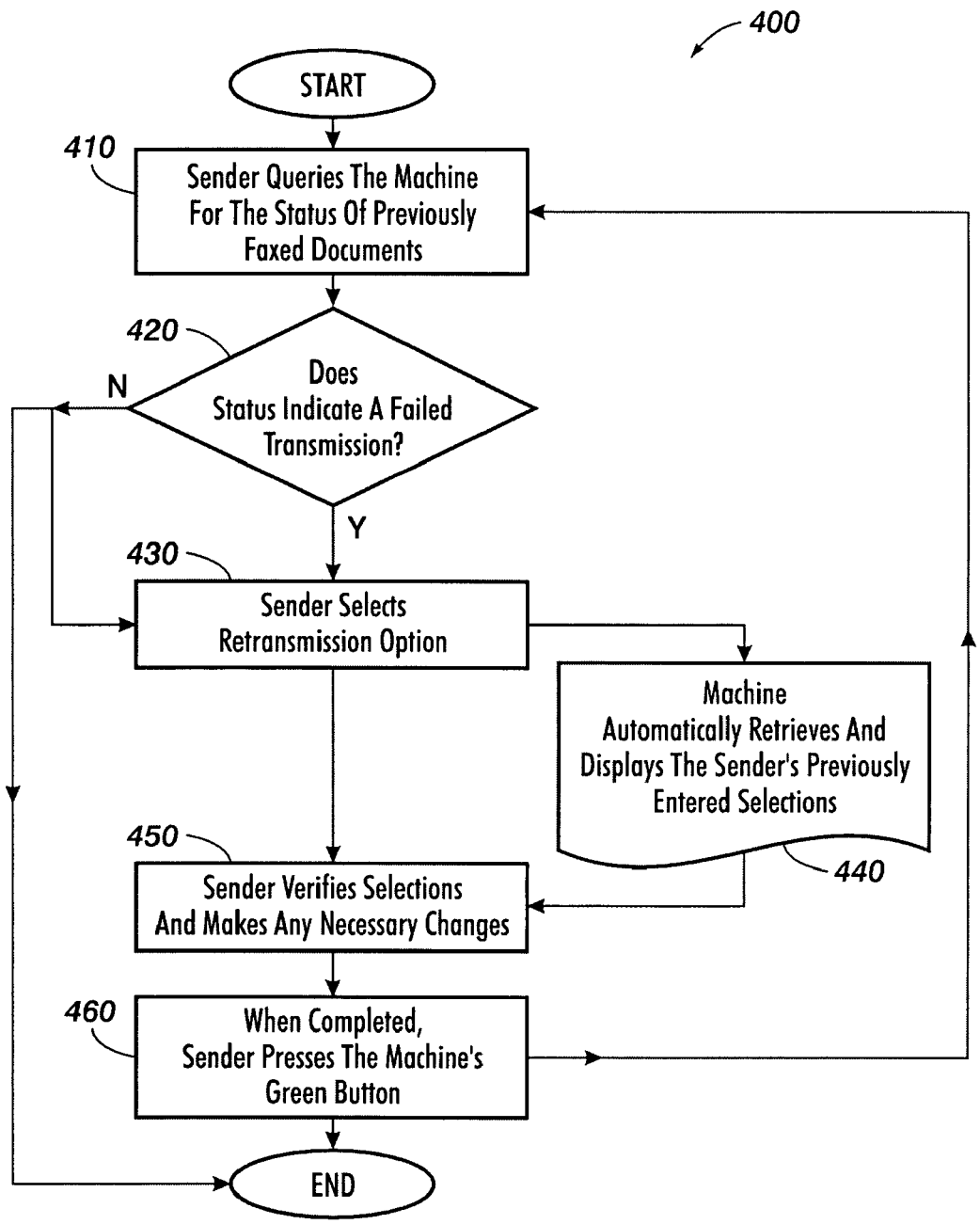
FIG. 4 is a flowchart showing a method for locally retransmitting a fax using information stored on the fax capable printer without having to rescan the same documents again, in accordance with an embodiment.

FIG. 4 is a flowchart showing a method 400 for locally retransmitting a fax using information stored on the fax capable printer without having to rescan the same documents again, in accordance with an embodiment.

In step 410 of method 400, a user queries the fax capable printer for the status of a fax job. The user queries the fax capable printer using the user interface of the fax capable printer, for example.

In step 420, it is determined if the fax transmission of the fax job succeeded or failed. Preferably the fax is only retransmitted if the fax transmission failed. In another embodiment, the fax can be retransmitted regardless of whether or not the initial fax transmission failed, for example, if the send was successful, but there was a problems with the recipient receiving machine (e.g., machine made the document unreadable), the user may decide to send a new copy.

In step 430, a user selects an option to view and retransmit the fax job.

In step 440, the fax capable printer retrieves information about the fax job from a memory of the fax capable printer, including the selections previously entered by the user.

In step 450, the user verifies or edits the selection previously made the user.

In step 460, the user initiates a retransmission of the fax job. If the fax job information has not been edited to remove the selection of the option to store a scanned image of a faxed document in the memory on the fax capable printer, method 400 returns to step 410. In the drawings, the button for sending the signal to initiate retransmission is referred to as the green button, as was the case in step 165 in FIG. 1, simply because green is a common color for a send button. Of course, the button may have any color, or any shape of configuration, and any form of input other than a button may be used.

Figure 5:
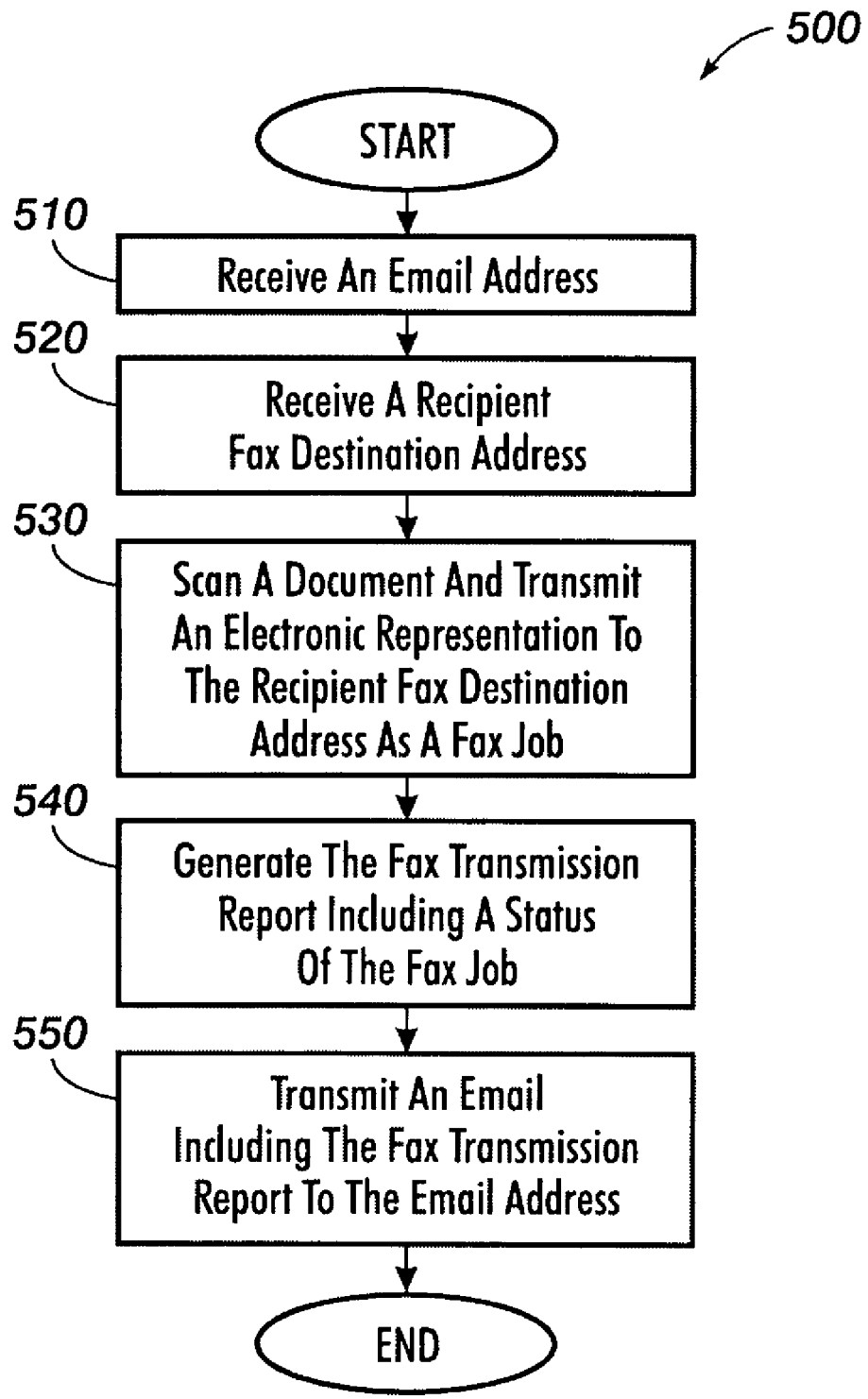
FIG. 5 is a flowchart showing a method for electronically transmitting a fax transmission report for a fax job from a fax capable printer using email, in accordance with an embodiment.

FIG. 5 is a flowchart showing a method 500 for electronically transmitting a fax transmission report for a fax job from a fax capable printer using email, in accordance with an embodiment.

In step 510 of method 500, an email address is received. The email address can be an email address for a user, who is the sender of the fax, or an email address for a recipient of the fax. The email address is obtained from the user. The user enters the email address using a user interface of the fax capable printer, for example.

In another embodiment, the email address is obtained from a database according to login information entered by the user on a user interface of the fax capable printer. The login information includes a user ID and password, for example.

In step 520, a recipient fax destination address is received. A recipient fax destination address is a telephone number where the fax is being sent, for example, but could also be an email address or other type of electronic address. The recipient fax destination address is preferably stored in a memory of the fax capable printer.

In step 530, the document is scanned and an electronic representation of the document is transmitted to the recipient fax destination address as a fax job. In another embodiment, data from scanning the document is stored in a memory of the fax capable printer prior to transmission. A signal to initiate the scanning and transmitting of the document is generated by the user depressing a button on the fax capable printer, for example.

In step 540, the fax transmission report is generated. The fax transmission report includes the status of the fax job.

In step 550, an email including the fax transmission report is transmitted to the email address. In another embodiment, the email includes a link to a Web service of the fax capable printer. The link is, for example, a URL to the Web service. The Web service can include, but is not limited to, a Web service for retrieving the recipient fax destination address from the memory, a Web service for displaying the recipient fax destination address to user, a Web service allowing the user to edit the recipient fax destination address, or a Web service for transmitting the scanned image to the recipient fax destination address.

In another embodiment, the recipient fax destination address is stored in the link to the Web service. The Web service can include, but is not limited to, a Web service for retrieving the recipient fax destination address from the link, a Web service for displaying the recipient fax destination address to user, a Web service allowing the user to edit the recipient fax destination address, or a Web service for transmitting the scanned image to the recipient fax destination address.

In another embodiment, the fax job is saved in a memory for the fax capable printer and is available for recall via a user interface of the fax capable printer. The recipient fax destination address is stored in the memory. A signal to save the fax transmission report in the memory is received from the user. Another signal to display information from the fax transmission report on a user interface of the fax capable printer is received from the user. The fax transmission report is retrieved from the memory. The information from the fax transmission report is displayed on the user interface of the fax capable printer.

In another embodiment, a signal to transmit the scanned image to the recipient fax destination address is received from the user. The scanned image is then transmitted to the recipient fax destination address.

In another embodiment, a signal to edit the recipient fax destination address is received from the user. The recipient fax destination address is edited by the user. Another signal to transmit the scanned image to the recipient fax destination address is received from the user. The scanned image is transmitted to the recipient fax destination address.

Figure 6:
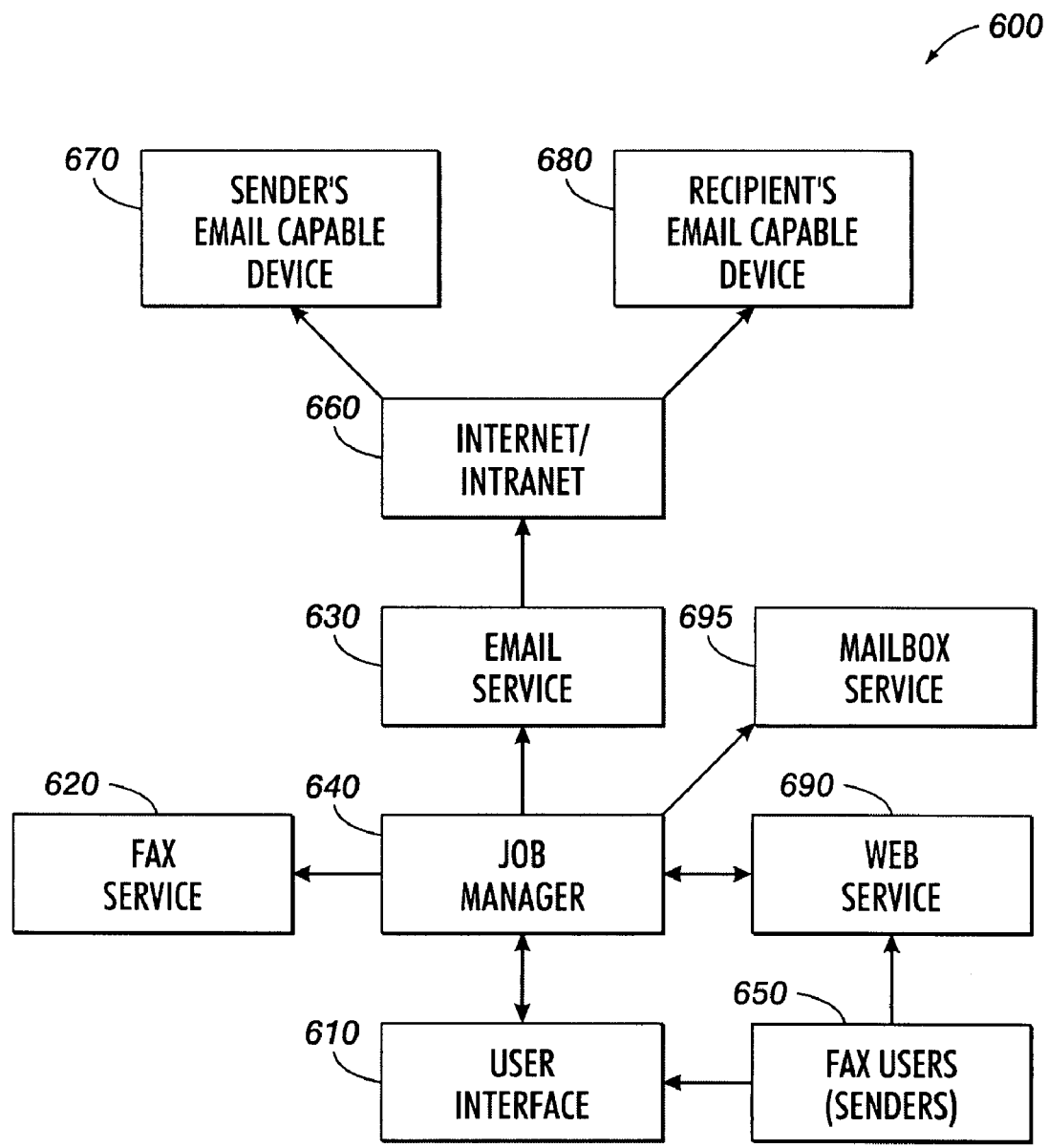
FIG. 6 is a schematic diagram of a system for electronically transmitting a fax transmission report for a fax job from a fax capable printer using email, in accordance with an embodiment.

FIG. 6 is a schematic diagram of a system 600 for electronically transmitting a fax transmission report for a fax job from a fax capable printer using email, in accordance with an embodiment. System 600 includes user interface 610, fax service 620, email service 630, and job manager 640. User interface 610, fax service 620, email service 630, and job manager 640 are software components that are executed on one or more processors of the fax capable printer. User interface 610 receives an email address, receives a recipient fax destination address, and receives a signal to fax a document from user 650. Job manager 640 receives the email address, the recipient fax destination address, and the signal to fax the document from user interface 610. Job manager 640 transmits the document to the recipient fax destination address as a fax job by sending the recipient fax destination address to fax service 620. Job manager 640 monitors fax service 620 for the status of the fax job. Job manager 640 generates the fax transmission report. The fax transmission report includes the status of the fax job. Job manager 640 transmits an email, which includes the fax transmission report or a link thereto, to the email address by sending the email address and the fax transmission report to email service 630. For example, sending the email comprising the status of the fax job may comprises at least one of: (a) embedding the fax transmission report in the body of the email (e.g., as text or as an image); (b) attaching the fax transmission report as an attachment (e.g., a text file or an image file such as a TIFF or PDF file) to the email; and (c) embedding a link (e.g., a hyper-link or URL), to the fax transmission report in the body of the email.

Email service 630 sends the email including the transmission report or link thereto across network 660. Network 660 can include but is not limited to an intranet or the Internet. The email can be sent to the user's email address 670 or the recipient's email address 680.

In another embodiment, job manager 640 places a link to Web service 690 in the email. User 650 can then access Web service 690 by following the link in the email.

In another embodiment, fax service 620 creates a scanned image of the document, stores the scanned image in a memory for the fax capable printer, and transmits an electronic representation of the scanned image to the recipient fax destination address. Job manager 640 stores the recipient fax destination address and other information about the fax job in the memory. Mailbox service 695 is used to retrieve the scanned image and all other information about the fax job from the memory. User 650 accesses the scanned image and all other information about the fax job through user interface 610 and job manager 640.

Figure 7:
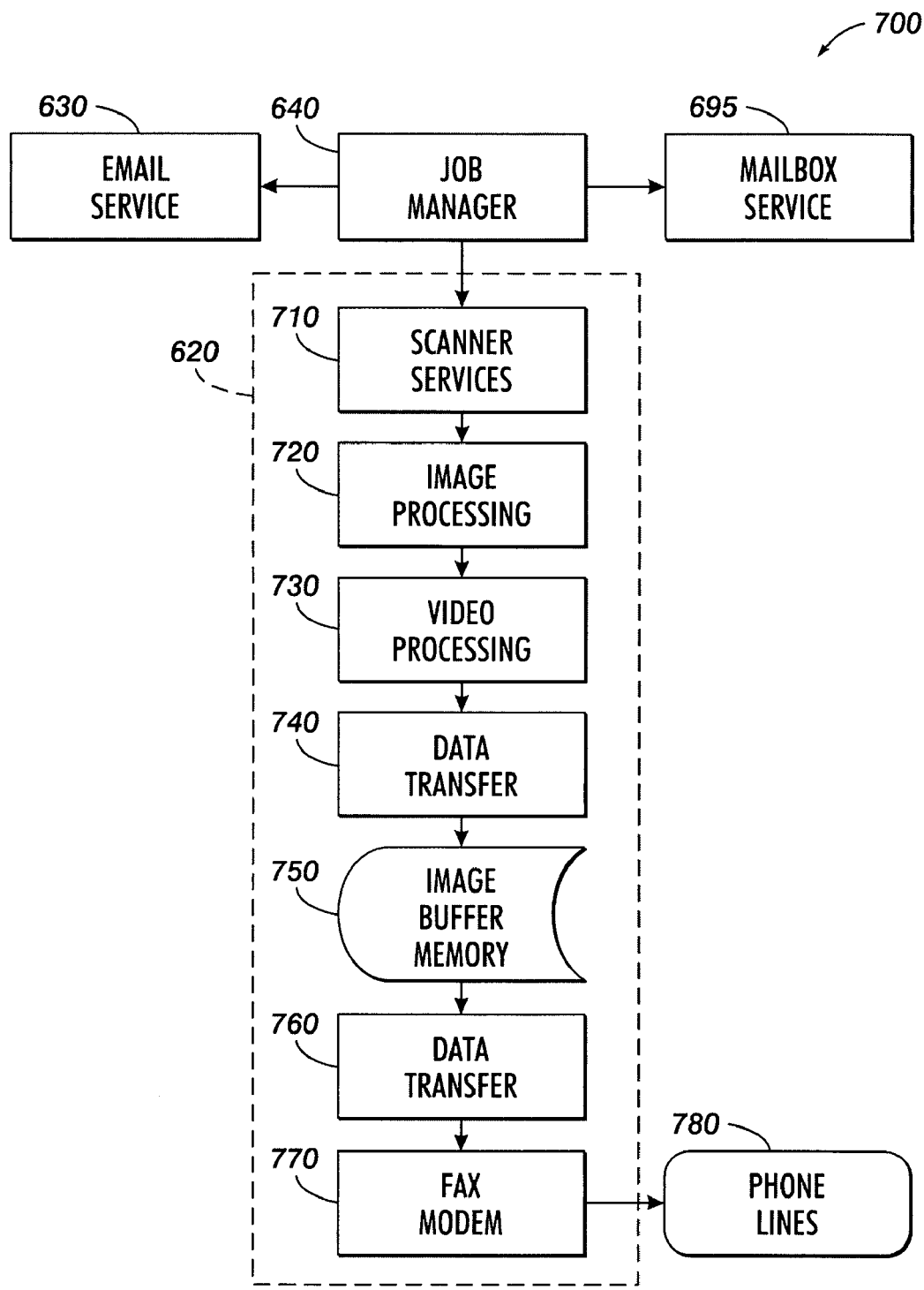
FIG. 7 is a schematic diagram of a system for electronically transmitting a fax transmission report for a fax job from a fax capable printer using email showing the components of a fax service, in accordance with an embodiment.

FIG. 7 is a schematic diagram of a system 700 for electronically transmitting a fax transmission report for a fax job from a fax capable printer using email showing the components of fax service 620, in accordance with an embodiment. System 700 includes email service 630, job manager 640, mailbox service 695, and fax service 620. Job manager 640 connects to email service 630, mailbox service 695 and fax service 620. Fax service 620, like all software components described herein, can consist of lower level software components. Fax service 620, for example, includes scanner services 710, image processing component 720, video processing component 730, data transfer component 740, image memory buffer component 750, data transfer component 760, and fax modem component 770. Fax service 620 is additionally connected to phone lines 780 through fax modem component 770.

Figure 8:
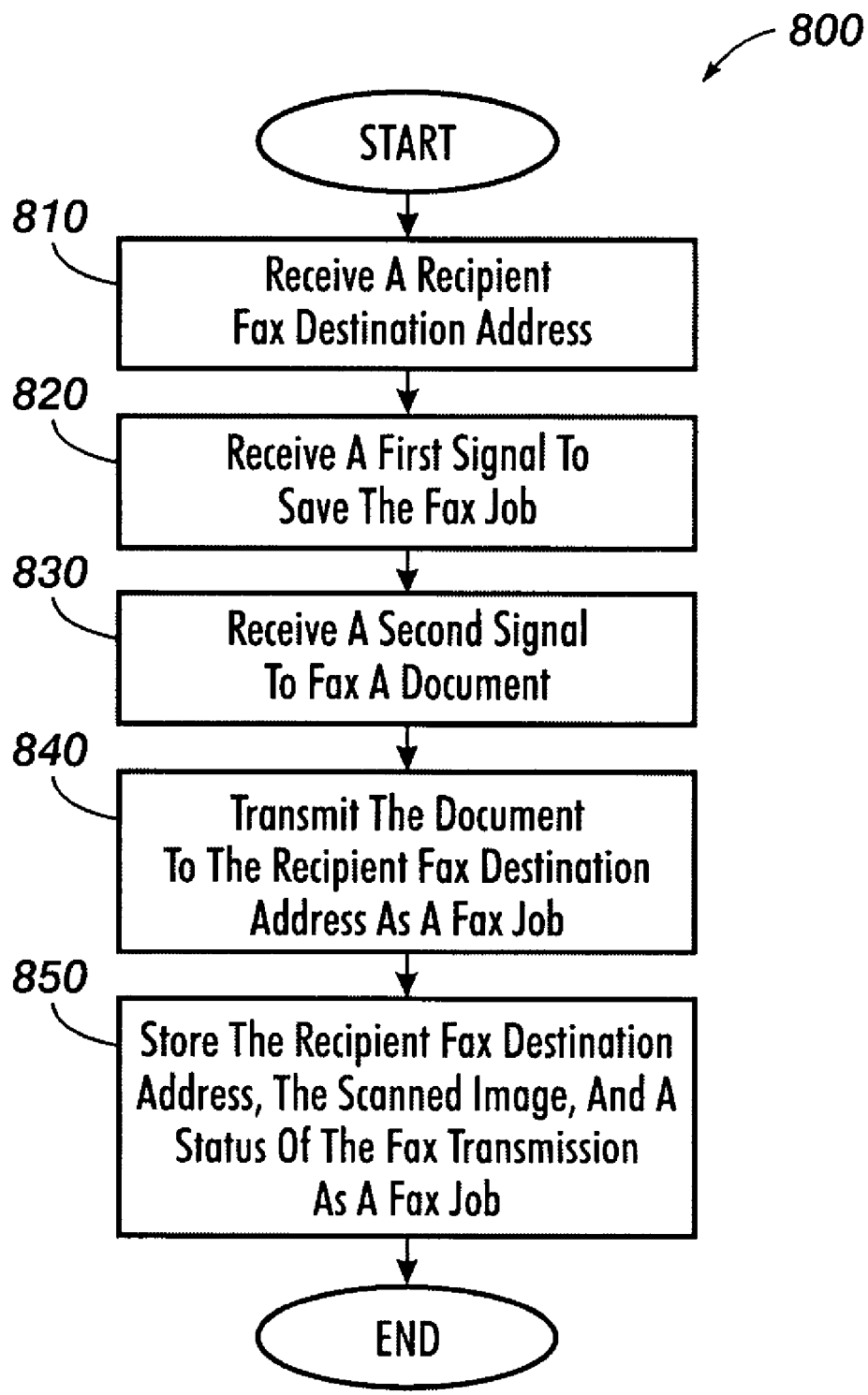
FIG. 8 is a flowchart showing a method for storing a fax job on a fax capable printer, in accordance with an embodiment.

FIG. 8 is a flowchart showing a method 800 for storing a fax job on a fax capable printer, in accordance with an embodiment.

In step 810 of method 800, a recipient fax destination address is received.

In step 820, a first signal to save the fax job is received.

In step 830, a second signal to fax a document is received.

In step 840, the document is transmitted to the recipient fax destination address as a fax job. Transmitting the document to the recipient fax destination address includes creating a scanned image of the document.

In step 850, the recipient fax destination address, the scanned image, and a status of transmitting the document as a fax job are stored in a memory of the fax capable printer.

In another embodiment, a third signal to the display the status of the fax job is received from a user. The status is retrieved from a memory for the fax capable printer. The status is displayed on a user interface of the fax capable printer. If the status indicates that the transmission of the fax job has failed, there may be an option to resend the fax job at the fax capable printer (see for example, method 400).

In a second embodiment, an electronic notification is sent from a MFD after a successful or failed scan transmission. When preparing to scan the document, a user enters an email address on the same user interface and in the same vicinity as the user enters a scan destination address. The email address is the email address of the user or the email address of the recipient. The user can optionally enable or disable the printing of a scan transmission report page by the MFD. The user can also optionally select or deselect an auto retry option to be applied if the initial scan transmission fails.

After entering the selections, the user initiates the scan transmission. The scan transmission is initiated by depressing a button on the MFD, for example. The MFD then monitors the scan job for a status and generates a scan transmission report. The fax transmission report may be stored locally in the memory for the MFD. The status of the scan job, e.g., the scan transmission report or a hyper-link thereto, is emailed to the email address entered by the user. A recipient may also receive a scan transmission report or the link thereto via email only if the scan transmission was successful. An email to a recipient also preferably includes a brief, generic or personalized message that indicates to the recipient that a document is waiting at the scan destination address. The scan transmission report is also printed by the MFD depending on the option selected by the user.

Figure 9:
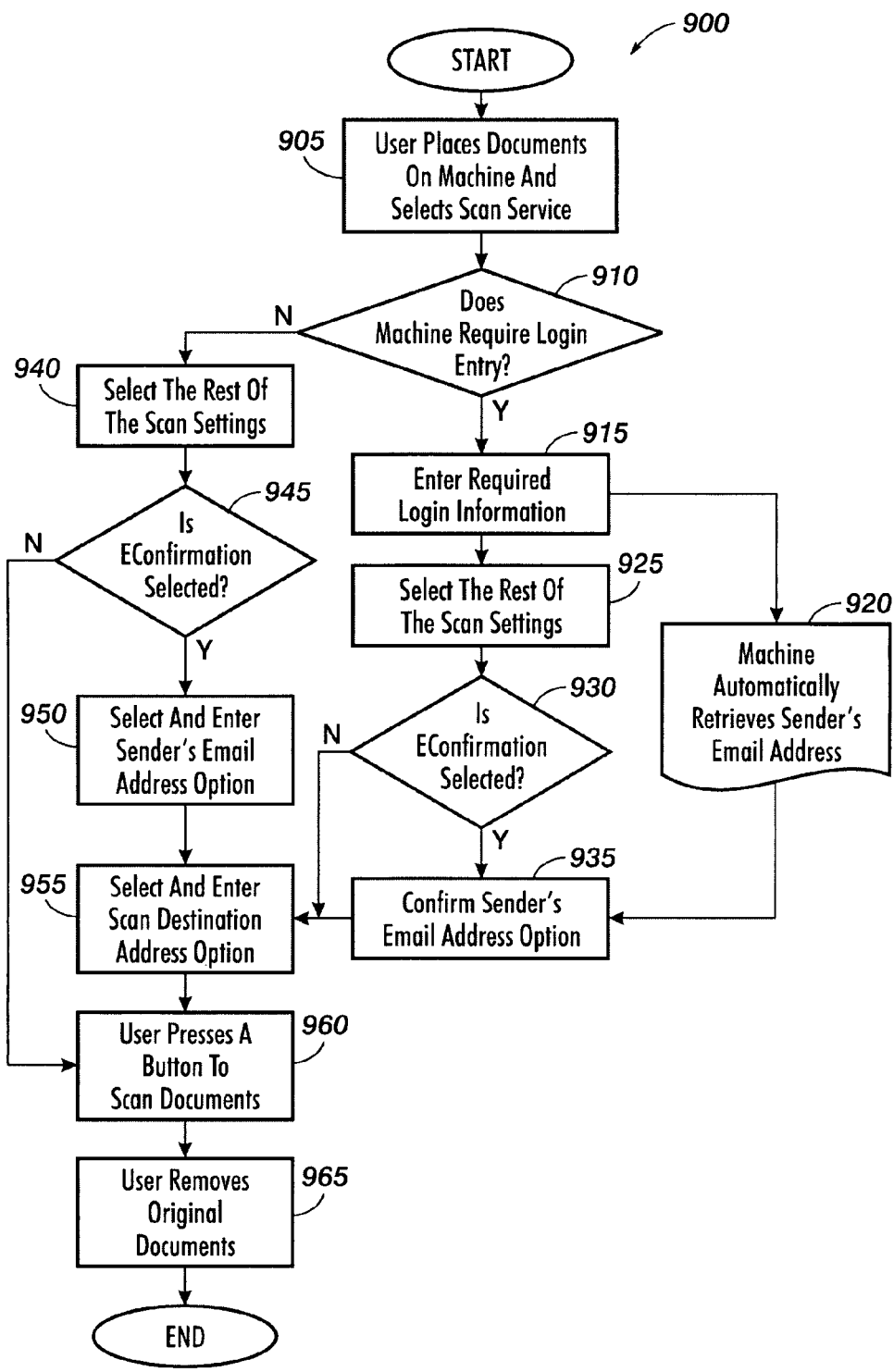
FIG. 9 is a flowchart showing a method for scanning documents, in accordance with an embodiment.

FIG. 9 is a flowchart showing a method 900 for scanning documents, in accordance with an embodiment.

In step 905 of method 900, a user places a document on a MFD and selects an option to scan the document. The selection is made from a user interface of the MFD, for example. A user interface of the MFD can include, but is not limited to, a display, a graphical user interface provided on a display, a keypad, and/or input buttons.

In step 910, it is determined if the MFD requires login information.

In step 915, login information is obtained from the user, if the MFD requires login information. Login information can include, but is not limited to, a user identification (ID) and password. The login information is entered by the user using a user interface of the MFD, for example.

In step 920, an email address for the user is obtained from a database according to the login information entered by the user in step 915. The database can be located on the MFD or accessed remotely via a network connected to the MFD. Alternatively, the user may manually enter his/her email address as is done in step 955, discussed below.

In step 925, the user selects the rest of the scan settings on the MFD as in the ordinary course of scanning.

In step 930, it is determined if the user has selected the electronic notification or confirmation option. Electronic confirmation is also referred to as "EConfirmation" The user selects electronic confirmation using the user interface of the MFD, for example.

In step 935, the user is prompted to confirm the email address obtained from the database in step 920, if electronic confirmation was selected by the user. The user confirms the email address using a user interface of the MFD, for example. The user may also opt to alter the email address (e.g., if an assistant wants the confirmation to go to his/her boss) or add additional email addresses (e.g., multiple persons on a team may wish to know when an important document has been sent to satisfy a deadline).

Step 940 show the process of the method when the MFD does not require login information as in the ordinary course of scanning. In step 940, the user selects the rest of the scan settings.

In step 945, it is determined if the user has selected the electronic confirmation option. The user selects electronic confirmation using a user interface of the MFD, for example.

In step 950, an email address for the user (or any other address or addresses where the user wants the email routed) is obtained from the user, if the electronic confirmation option was selected by the user and an option to notify the user by email was selected by the user. The email address for the user is later used to notify the user or his/her designee of the status of the scan transmission. The email address for the user is entered by the user using a user interface of the MFD, for example.

In step 955 (which may follow step 935 or step 950), a scan destination address is obtained from the user to designate where to transmit the scan. The scan destination address (or multiple addresses) is entered by the user using a user interface of the MFD, for example. Alternatively, a default scan destination address may be used. The scan destination address may be an email address or file storage destination address on a network. If the scan destination address is an email address then the scan job may be transmitted via email, for example, in the body of the email or as an attachment (e.g., a text or image file) to the email. The MFD may have a email client running with an email server running at the network destination. If the scan destination address is a file storage address, the scan may be transmitted, for example, by hypertext transfer protocol (HTTP) or file transfer protocol (FTP), over the network to the file storage address. The MFD may have a HTTP or FTP client running with an HTTP or FTP server running at the network destination.

Also, if email address is selected, the email may later used to notify status of the scan transmission. Both an email address or file storage destination address (or addresses) may be entered by the user using a user interface of the MFD, for example.

In step 960, a signal is received to scan one or more documents and the documents are scanned. The signal is obtained by the user pressing a button on the MFD, for example. In another embodiment, the button is part of the user interface of the MFD. Further, a signal is received to store the scan job locally and its status on the MFD, if the user selects the store scan job option. The stored scan job locally option is referred to as "Scan2Mailbox." Preferably, in addition to storing the scanned image data, the optimal information for sending the electronic confirmation will be stored as well so that it need not be reentered. The store scan job option may be selected by the user using a user interface of the MFD, for example. This option allows the user to return to the MFD and resubmit the scan job without having to rescan the same documents. This is beneficial in the event the job fails to send, and avoids the need for rescanning.

The scan job can also be stored locally in step 930 when a user selects electronic confirmation. Electronic confirmation allows the sender to resubmit the scan job without having to return to the MFD.

In step 965, the user removes one or more documents scanned from the MFD.

Figure 10:
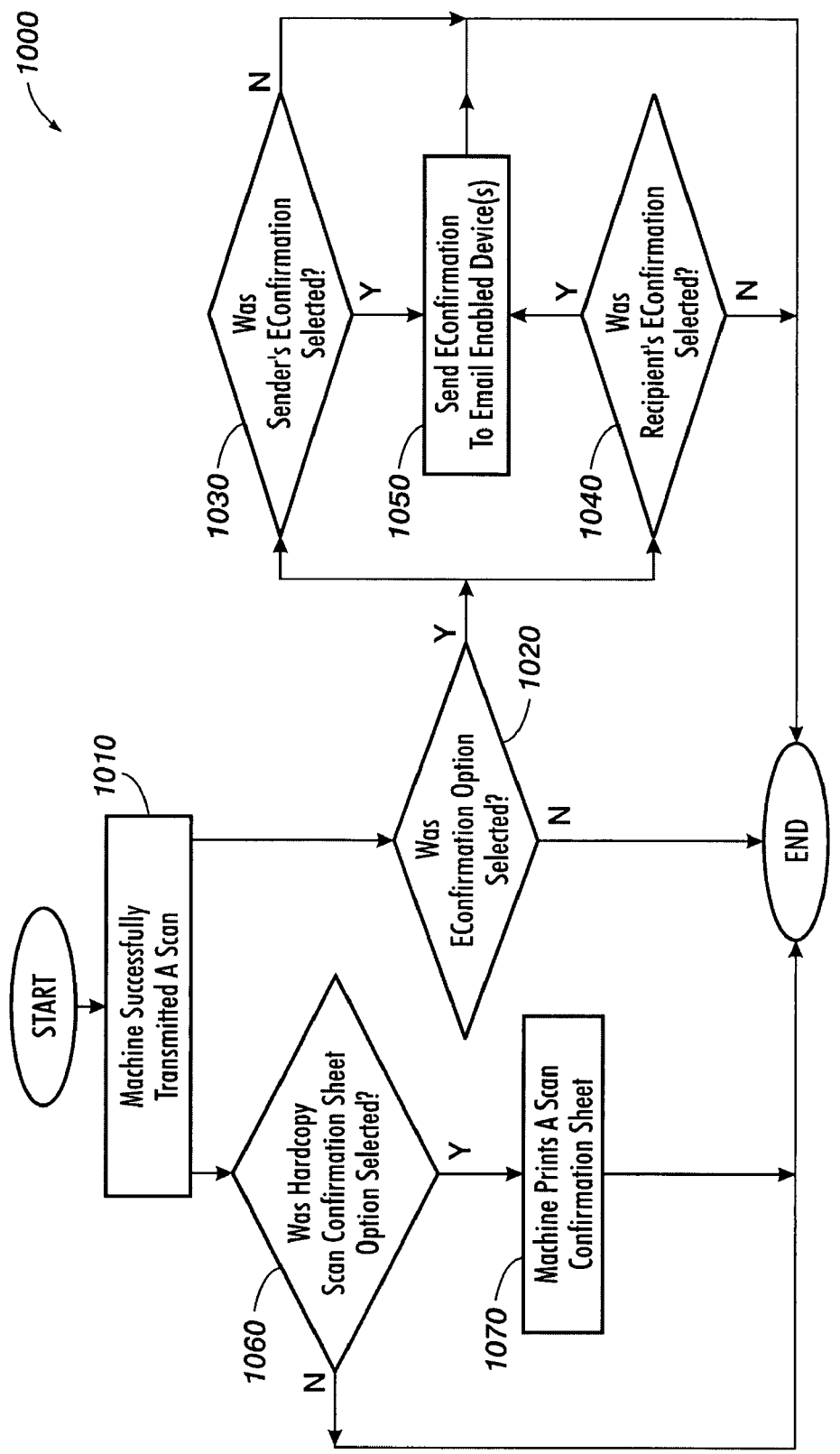
FIG. 10 is a flowchart showing a method for receiving confirmation of a scan transmission, in accordance with an embodiment.

FIG. 10 is a flowchart showing a method 1000 for receiving confirmation of a scan transmission, in accordance with an embodiment.

In step 1010 of method 1000, a MFD has successfully transmitted a scan.

In step 1020, it is determined if the user has selected the electronic confirmation option.

In step 1030, it is determined if the user selected sending an electronic confirmation to the sender or user. If the user selected sending an electronic confirmation to the sender, the user would have entered an email address for the user, or the email address would have been obtained from a database using login information.

In step 1040, it is determined if the user selected sending an electronic confirmation to the recipient. If the user selected sending an electronic confirmation to the recipient, the user would have entered an email address for the recipient.

In step 1050, an electronic confirmation is sent, if the user selected sending an electronic confirmation to the sender (or a designee) or if the user selected sending an electronic confirmation to the recipient. An electronic confirmation is sent to the user and the recipient, as applicable. The electronic confirmation can be received by the user or the recipient at any email enabled device. An emailed enabled device can include, but is not limited to, a computer, a cellular phone, and a personal digital assistant. An email may include any electronically sent message, and may include typical emails and other messaging such as instant messaging or text messaging.

In step 1060, it is determined if the user selected printing a scan confirmation sheet, or a scan transmission report page, by the MFD.

In step 1070, the scan transmission sheet is printed by the MFD. In another embodiment, the email that is sent to the email address also includes a link, hyper-link, or universal resource locator (URL), to the MFD's Web server if the email address is the email address of the user. The link allows the user to run a Web service to retrieve the scan job status, and the scan job information, including all previously entered selections. A Web service can also allow the user to view the scan destination address, edit the scan destination address, retransmit the scan, delete the scan job, or reformat the scan from the MFD. The link is preferably included if the scan transmission failed. However, the link can also be sent if the scan transmission is successful. A user can decide to resend a successful scan to the same scan destination address or other scan destination addresses, for example.

In another embodiment, the link is included in an email sent to the email address of the recipient. However, a Web service providing retransmission of the scan is preferably not available to a recipient. A user or recipient accesses the link and executes a Web service using a Web browser (e.g., Microsoft Internet Explorer®, Mozilla Firefox® Apple Safari®, Netscape®, or Opera®).

Figure 11:
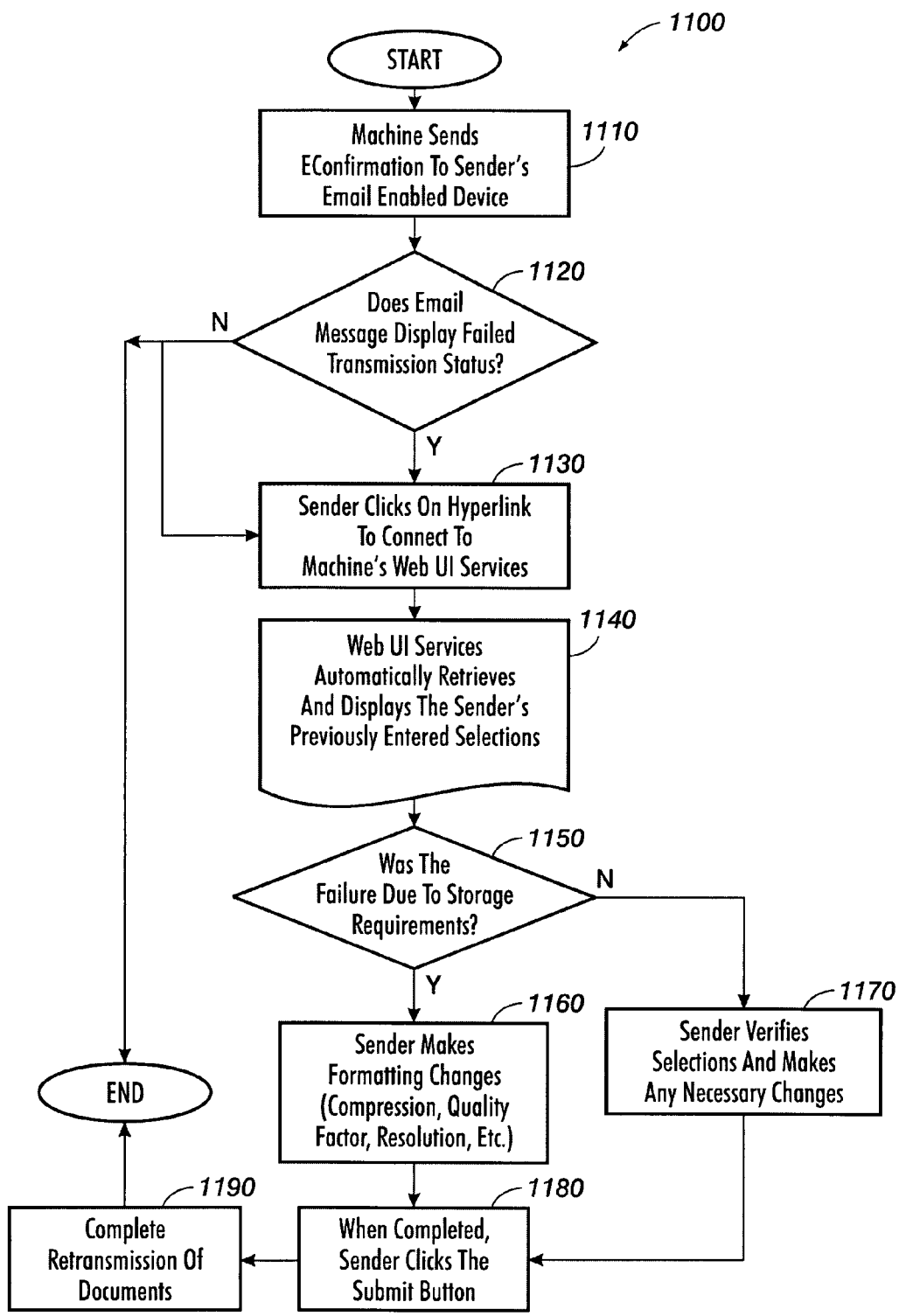
FIG. 11 is a flowchart showing a method for remotely retransmitting a scan using a Web service without having to rescan the same documents again, in accordance with an embodiment.

FIG. 11 is a flowchart showing a method 1100 for remotely retransmitting a scan using a Web service without having to rescan the same document again, in accordance with an embodiment. The Web service is a user interface (UI) service, for example, an Internet or web-based server application e.g., in HTML, Java, and/or Perl, associated with the MFD's web server.

In step 1110 of method 1100, an electronic confirmation is sent to the user, and/or sender. The electronic confirmation is an email sent to the email address of the user. The electronic confirmation can be received by the user at any email enabled device. An emailed enabled device may include, but is not limited to, a computer, a cellular phone, and a personal digital assistant. Upon receipt of the confirmation, the user knows whether the scan transmission was successful remotely from the MFD. This is similar to the Scan Transmission Report conventionally generated at the MFD. The email will notify the user whether the transmission was successful or has failed.

In step 1120, it is determined if the scan transmission succeeded or failed. Preferably, a link is only added to the email if the scan transmission has failed. In embodiments, a link is added regardless of whether the scan transmission has failed.

In step 1130, the user selects or "clicks" on the hyperlink or URL to connect to the Web U Services' web site.

In step 1140, the Web service automatically retrieves the scan job information, including selections previously entered by the user.

In step 1150, it is determined if there was a failure to transmit due to insufficient memory space at the destination.

In step 1160, if the transmission failed or was declined due to insufficient memory space at the destination or file size transfer restrictions, an option to reformat the data may be provided to assist the user in reducing the file size. In other embodiments, this feature may always be provided to the user to reformat the data. Reformatting of images may include changing compression options, ZIP file format compression, Mixed Raster Content (MRC) compression, Joint Bi-level Experts Group's JBIG2 compression, resolution conversion to lower resolutions, adjusting compression quality factors, changing color to grayscale, etc. Other data compression algorithms, however, may be used as well. Alternatively, the MFD Web services may be configured to automatically reformat the data to reduce file size as a default option. Other reformatting may be used, such as changing scan parameters, such as resolution and color/grayscale selection.

In another embodiment, the Web service could query the scan destination for available storage space based on a compression ratio predictor that estimates the size of the compressed scan job, for example as disclosed in U.S. patent application Ser. No. 11/170,490 (U.S. Patent Application Publication No. 2007/0002391) as discussed above. Based on feedback from the scan destination the Web service could provide options to the user accordingly to select a compression algorithm.

In step 1170, the user verifies the scan job information and can edit the scan job information. Using a standard web browser, for example, the user can re-verify the scan destination file storage address (for "scan2file" jobs), or destination email address (for "scan2email" jobs) and resubmit the job, or delete the job.

In step 1180, when the user is finished and selects or "clicks" the submit button from the Web services, retransmission of the scan job commences.

In step 1190, retransmission of scan job information is completed.

Another embodiment is a method of storing and recalling scan jobs on a MFD. Prior to submitting a scan job, a user can select an option to store a scanned image of a scanned document in a memory on the MFD. The memory of a MFD can include, but is not limited to, the physical memory of the MFD, a database of the MFD, or a memory on a network which the MFD is connected. The option of storing a scanned image can be selected with the electronic notification via email option or without the electronic notification via email option. When the option of storing a scanned image is selected, the user can return to the machine sometime later to query the status of the scan transmission. If the scan transmission fails for any reason, the user can easily retrieve the scanned image of the document from a memory of the MFD without having to rescan the documents.

The memory for the MFD containing the scanned image and other scan job information is called a "mailbox," for example. On retrieval of the scan job from the mailbox, the machine automatically displays all previously entered job selections. This allows the user to quickly confirm all the information, make any necessary changes and re-submit the scan transmission. The option to store a scanned image of a scanned document increases the productivity of the user by removing the burden on the user to physically retrieve the original hard copy of the document. In addition, the option to store a scanned image of a scanned document frees the user from having to rescan the document all over again. Finally, an option to store a scanned image of a scanned document is particular convenient for a user who works in a large and open setting, such as manufacturing floor, where access to email is inconvenient or difficult.

Figure 12:
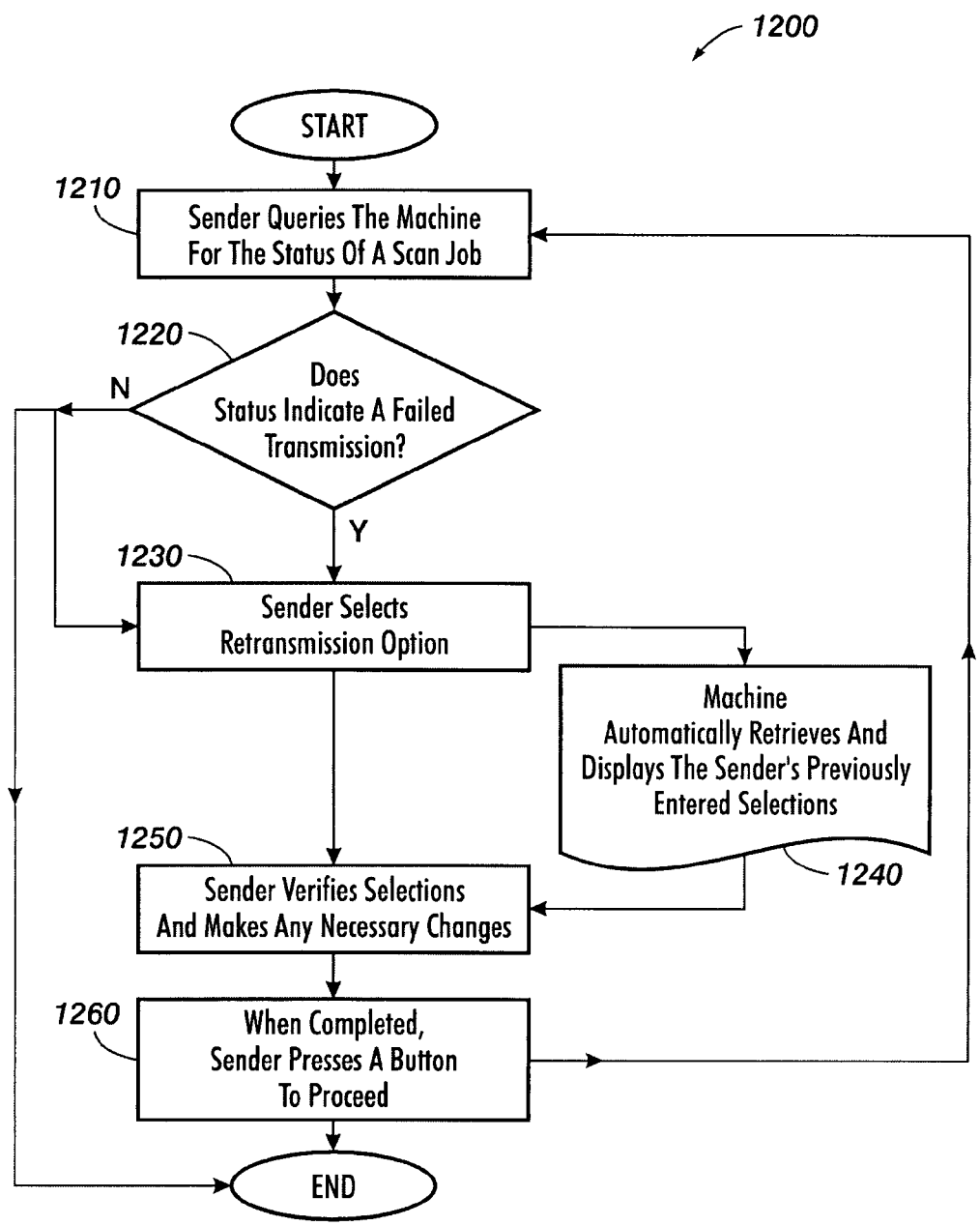
FIG. 12 is a flowchart showing a method for locally retransmitting a scan using information stored on the MFD without having to rescan the same documents again, in accordance with an embodiment.

FIG. 12 is a flowchart showing a method 1200 for locally retransmitting a scan using information stored on the MFD without having to rescan the same documents again, in accordance with an embodiment.

In step 1210 of method 1200, a user queries the MFD for the status of a scan job. The user queries the MFD using the user interface of the MFD, for example.

In step 1220, it is determined if the scan transmission of the scan job succeeded or failed. Preferably the scan is only retransmitted if the scan transmission failed. In another embodiment, the scan can be retransmitted regardless of whether or not the initial scan transmission failed, for example, if the send was successful, but there was a problem with the recipient receiving machine.

In step 1230, a user selects an option to view and retransmit the scan job.

In step 1240, the MFD retrieves information about the scan job from a memory for the MFD, including the selections previously entered by the user.

In step 1250, the user verifies or edits the selection previously made the user.

In step 1260, the user initiates a retransmission of the scan job, for example, by pressing a button on the user interface of the MFD to proceed. If the scan job information has not been edited to remove the selection of the option to store a scanned image of a scanned document in the memory on the MFD method 1200 returns to step 1210.

Figure 13:
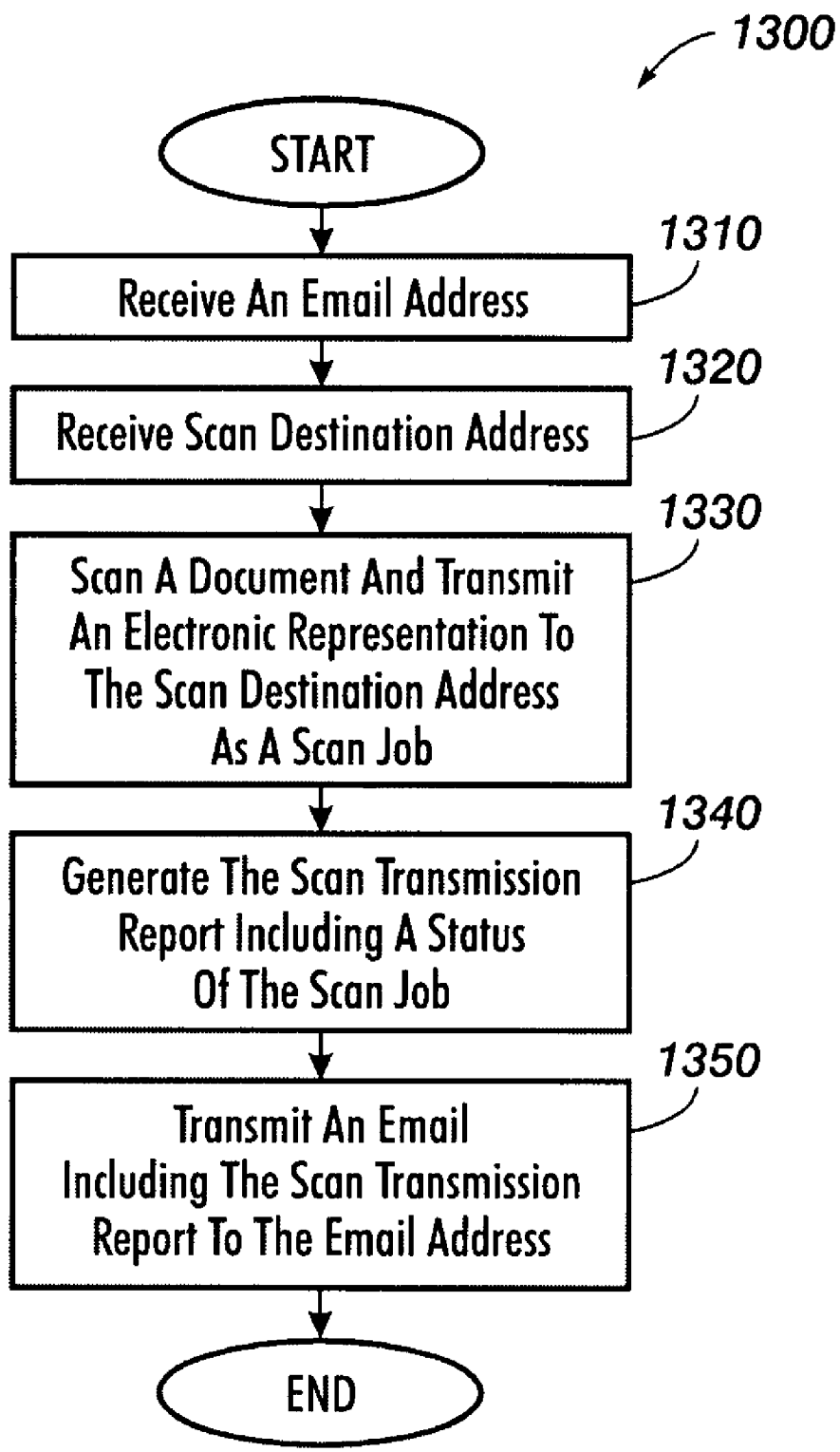
FIG. 13 is a flowchart showing a method for electronically transmitting a scan transmission report for a scan job from a MFD using email, in accordance with an embodiment.

FIG. 13 is a flowchart showing a method 1300 for electronically transmitting a scan transmission report for a scan job from a MFD using email, in accordance with an embodiment.

In step 1310 of method 1300, an email address is received. The email address can be an email address for a user, who is the sender of the scan, and/or an email address for a recipient of the scan. The email address is obtained from the user. The user enters the email address using a user interface of the MFD, for example.

In another embodiment, the email address is obtained from a database according to login information entered by the user on a user interface of the MFD. The login information includes a user ID and password, for example.

In step 1320, a scan destination address is received. Alternatively, a default scan destination address may be provided. A scan destination address may be file storage address on a network or an email address where the scan is being sent, for example. The scan destination address is preferably stored in a memory of the MFD.

In step 1330, the document is scanned and an electronic representation of the document is transmitted to the scan destination address as a scan job. In another embodiment, data from scanning the document is stored in a memory of the MFD prior to transmission. A signal to initiate the scanning and transmitting of the document is generated by the user depressing a button on the MFD, for example.

In step 1340, the scan transmission report is generated. The scan transmission report includes the status of the scan job.

In step 1350, an email including the scan transmission report or a link thereto is transmitted to the email address. In another embodiment, the email includes a link to a Web service of the MFD. The link is, for example, a URL to the Web service. The Web service can include, but is not limited to, a Web service for retrieving the scan destination address from the memory, a Web service for displaying the scan destination address to user, a Web service allowing the user to edit the scan destination address, a Web service allowing the user to reformat the scanned image data, a Web service allowing the user to delete the scan job, or a Web service for transmitting the scanned image to the scan destination address.

In another embodiment, the scan destination address is stored in the link to the Web service. The Web service can include, but is not limited to, a Web service for retrieving the scan destination address from the link, a Web service for displaying the scan destination address to user, a Web service allowing the user to edit the scan destination address, a Web service allowing the user to reformat the scanned image data, a Web service allowing the user to delete the scan job, or a Web service for transmitting the scanned image to the scan destination address.

In another embodiment, the scan job is saved in a memory of the MFD and is available for recall via a user interface of the MFD. The scan destination address is stored in the memory. A signal to save the scan transmission report in the memory is received from the user. Another signal to display information from the scan transmission report on a user interface of the MFD is received from the user. The scan transmission report is retrieved from the memory. The information from the scan transmission report is displayed on the user interface of the MFD.

In another embodiment, a signal to transmit the scanned image to the scan destination address is received from the user. The scanned image is then transmitted to the scan destination address.

In another embodiment, a signal to edit the scan destination address is received from the user. The scan destination address is edited by the user. Another signal to transmit the scanned image to the scan destination address is received from the user. The scanned image is transmitted to the scan destination address.

Figure 14:
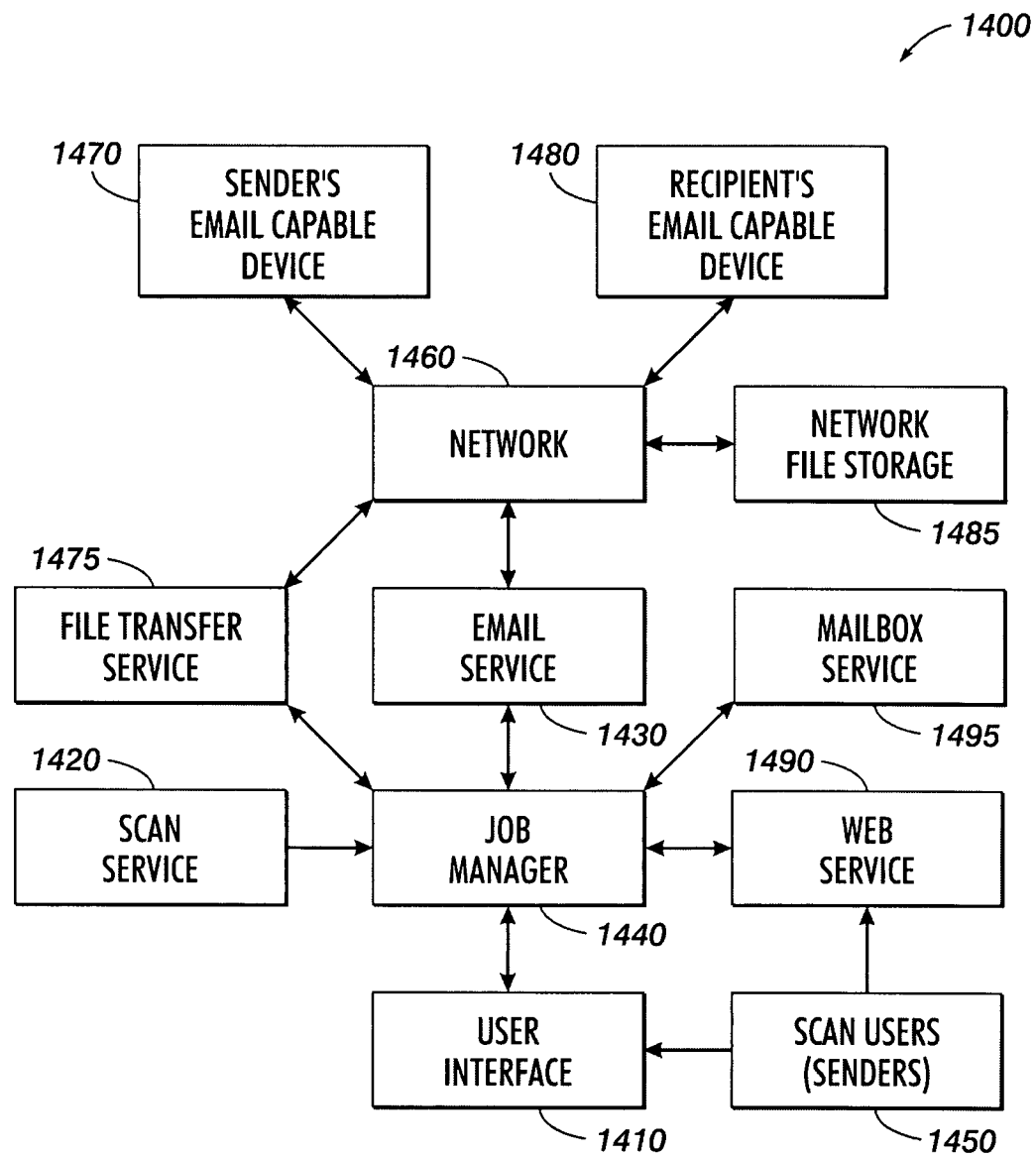
FIG. 14 is a schematic diagram of a system for electronically transmitting a scan transmission report for a scan job from a MFD using email, in accordance with an embodiment.

FIG. 14 is a schematic diagram of a system 1400 for electronically transmitting a scan transmission report for a scan job from a MFD using email, in accordance with an embodiment. System 1400 includes user interface 1410, scan service 1420, email service 1430, file transfer service 1475, and a job manager 1440. User interface 1410, scan service 1420, email service 1430, file transfer service 1475, and job manager 1440 are software components that are executed on one or more processors of the MFD. User interface 1410 receives an email address, receives a scan destination address, and receives a signal to scan a document from user 1450. Job manager 1440 receives the email address, the scan destination address, and the signal to scan the document from user interface 1410. Job manager 1440 transmits the document to the scan destination address as a scan job through an email service 1430 (for scan2email) or a file transfer service 1475 (for scan2file), or possibly both if desired. Job manager 1440 monitors the status of the scan jobs. Job manager 1440 generates the scan transmission report. The scan transmission report includes the status of the scan job. Job manager 1440 transmits an email, which includes the scan transmission report or link thereto, to the email address by sending the email address and the scan transmission report to email service 1430. For example, sensing the email comprising the status of the scan job may comprises at least one of: (a) embedding the scan transmission report in the body of the email (e.g., as text or as an image); (b) attaching the scan transmission report as an attachment (e.g., a text file or an image file such as TIFF or PDF file) to the email; and (c) embedding a link (e.g., a hyper-link or URL), to the scan transmission report in the body of the email.

Email service 1430 may be, for example, an email client (e.g., SMTP) that sends email including the scan transmission report across network 1460. Network 1460 may include but is not limited to an WAN, LAN, Intranet, the Internet, or combinations thereof. The email can be sent to the email address or either the user's email capable device 1470 and/or to a third party recipient's email capable device 1480 (if any).

For scan2email scan jobs, the email service 1430 will generate an email including the scan job to the email address corresponding to the scan destination address. The email service 1430 will send the email via the network 1460 to ultimately the user's email capable device 1470 and/or a third party recipient's email capable device 1480 (if any). The scan job may be embedded in the body of the email or as an email attachment (e.g., as a text file or image file such as a TIFF or PDF file).

For scan2file scan jobs, the file transfer service 1475 will send the scan job as a file via the network 1460 to a network file storage location 1485. The file transfer service 1475 may be for example, a HTTP or FTP client running with an HTTP or FTP server running at the network destination. The network file storage location 1485, may be a server, hard drive or other file storage device.

In another embodiment, job manager 1440 places a link to Web service 1490 in the email. User 1450 can then access Web service 1490 by following the link in the email.

In another embodiment, scan service 1420 creates a scanned image of the document, stores the scanned image in a memory for the MPD, and transmits an electronic representation of the scanned image to the scan destination address. Job manager 1440 stores the scan destination address and other information about the scan job in the memory. Mailbox service 1495 is used to retrieve the scanned image and all other information about the scan job from the memory. User 1450 accesses the scanned image and all other information about the scan job through user interface 1410 and job manager 1440.

Figure 15:
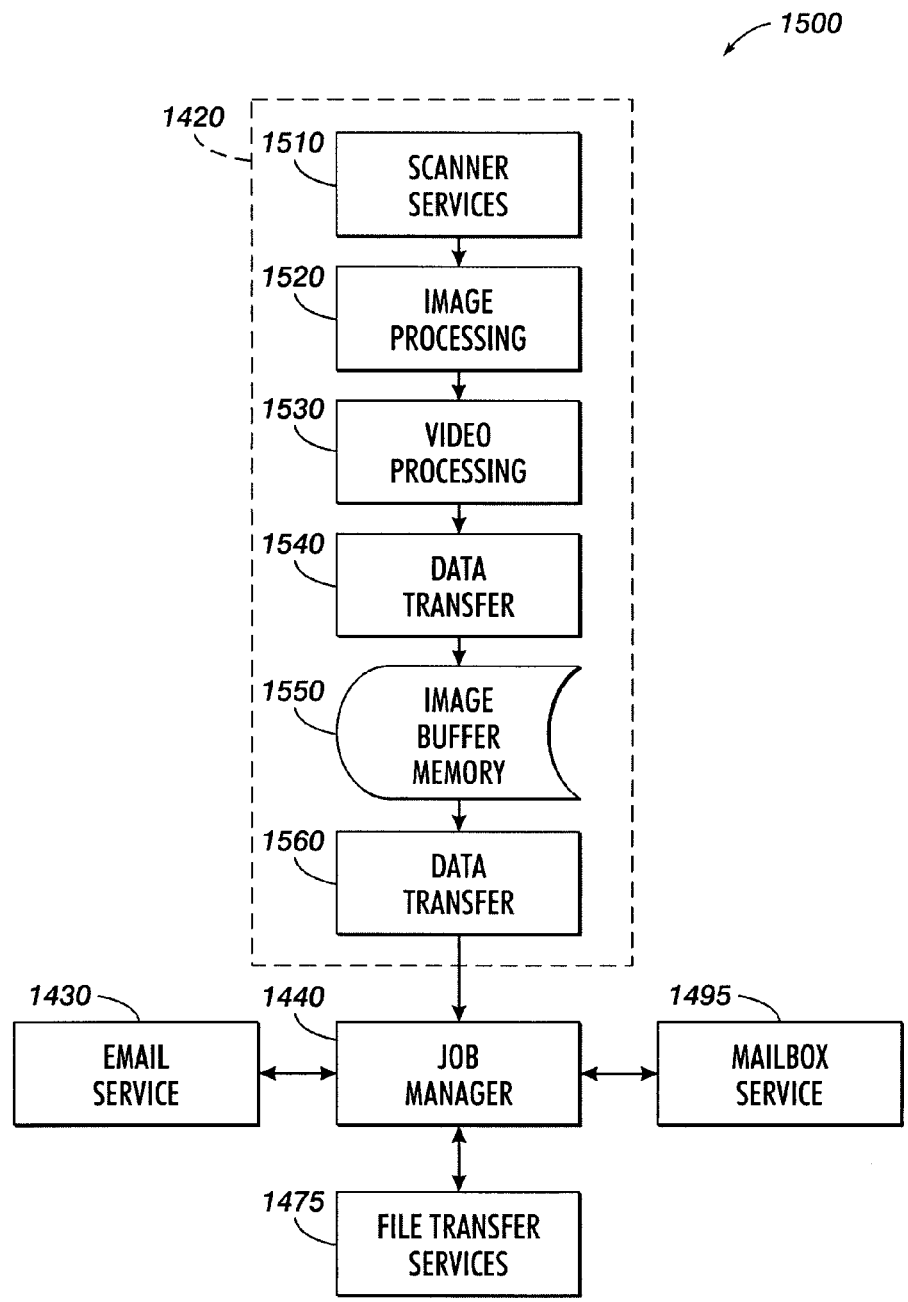
FIG. 15 is a schematic diagram of a system for electronically transmitting a scan transmission report for a scan job from a MFD using email showing the components of a scan service, in accordance with an embodiment.

FIG. 15 is a schematic diagram of a system 1500 for electronically transmitting a scan transmission report for a scan job from a MFD using email showing the components of scan service 1420, in accordance with an embodiment. System 1500 includes email service 1430, job manager 1440, mailbox service 1495, file transfer service 1475, and scan service 1420. Job manager 1440 connects to email service 1430, mailbox service 1495, file transfer service 1475, and scan service 1420. Scan service 1420, like all software components described herein, can consist of lower level software or hardware components, or combinations therefore. Scan service 1420, for example, includes, for example, scanner services 1510, image processing component 1520, video processing component 1530, data transfer component 1540, image memory buffer component 1550, data and transfer component 1560.

Figure 16:
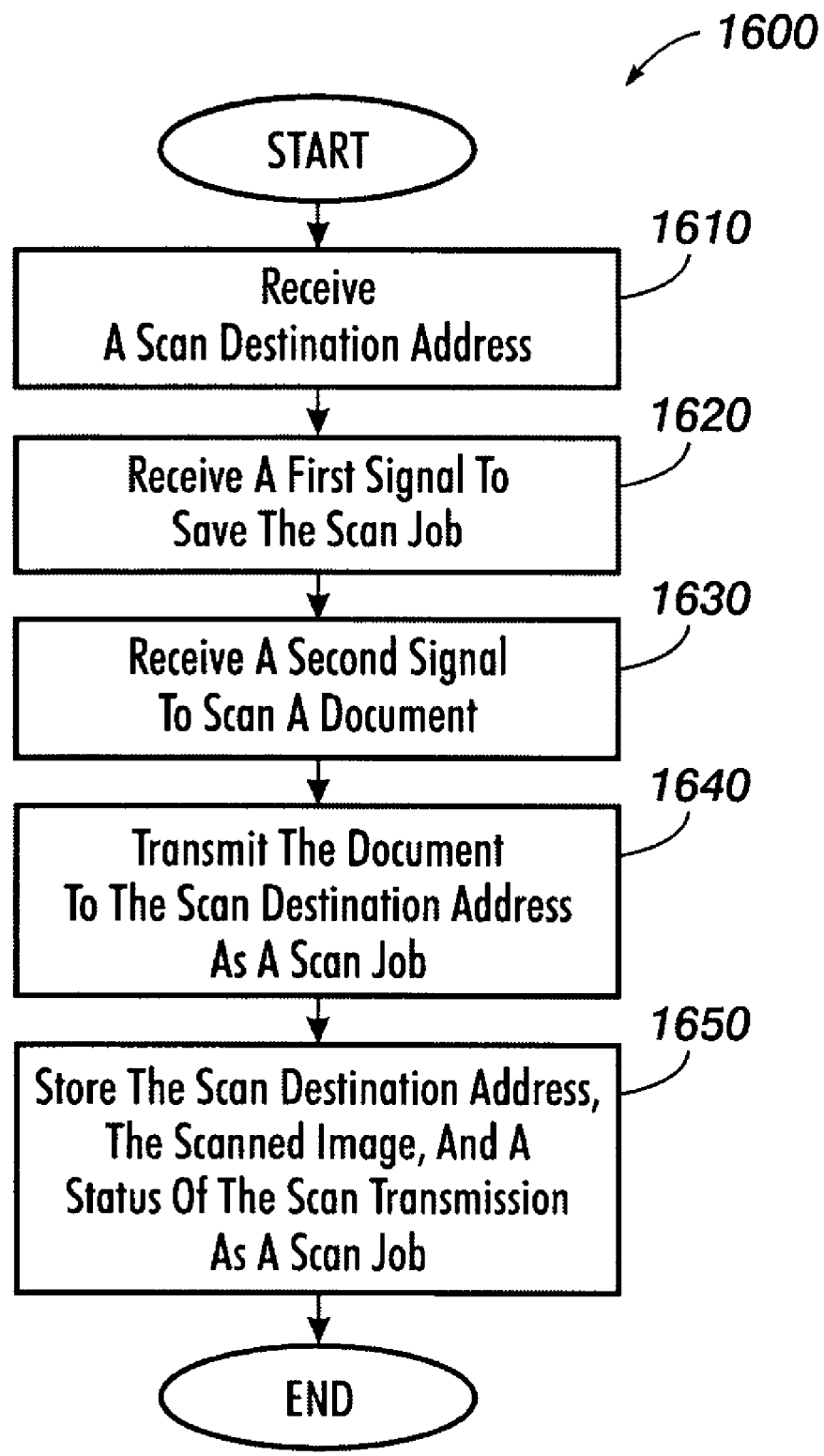
FIG. 16 is a flowchart showing a method for storing a scan job on a MFD, in accordance with an embodiment.

FIG. 16 is a flowchart showing a method 1600 for storing a scan job on a MFD, in accordance with an embodiment.

In step 1610 of method 1600, a scan destination address is received.

In step 1620, a first signal to save the scan job is received.

In step 1630, a second signal to scan a document is received.

In step 1540, the document is transmitted to the scan destination address as a scan job. Transmitting the document to the scan destination address includes creating a scanned image of the document.

In step 1650, the scan destination address, the scanned image, and a status of transmitting the document as a scan job are stored in a memory of the MFD.

In another embodiment, a third signal to the display the status of the fax job is received from a user. The status is retrieved from a memory for the MFD. The status is displayed on a user interface of the fax capable printer. If the status indicates that the transmission of the scan job has failed, there may be an option to resend the scan job at the MFD (see for example, method 1200).

Figure 17:
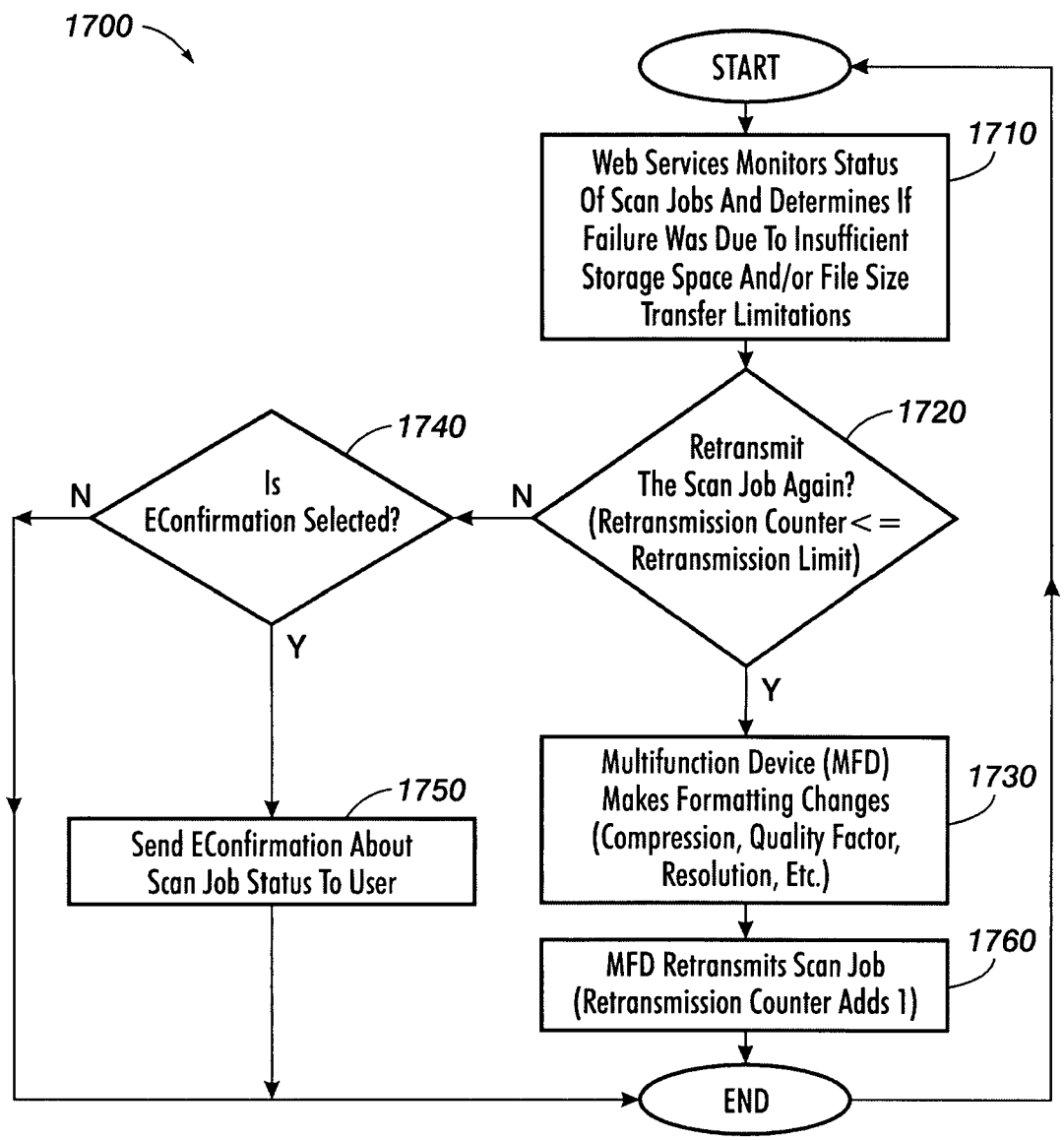
FIG. 17 is a flowchart showing a method for automatically retransmitting a scan job, in accordance with an embodiment.

FIG. 17 is a flowchart showing a method 1700 for automatically retransmitting a scan when transmission failure is due to storage or file size limitations, in accordance with an embodiment. This embodiment may be used alone or in conjunction with any of the other embodiment disclosed.

In step 1710 of method 1700, the MFD's Web service automatically monitors the status of scan jobs and determines if a failure was due to insufficient storage space and/or file size transfer limitations. Also, many email server mailboxes may have file size restrictions and/or limitations which may cause a failed transmission. The MFD may interpret the errors messages returned to it to determine if this is the case. For example, when a scan transmission fails, a network server will provide a specific error message back to the MFD (client) indicating there was an error via the same protocol (e.g., TCP/IP, HTTP, FTP, SMTP, etc.) that both the client and server are communicating. The MFD may be configured to query the status of scan jobs on a regular basis (e.g., every 30 minutes) or react immediately when an error message is received.

In step 1720, it is determined whether to retransmit the scan job again. The Web service may determine if a previous attempt to retransmit the scan job has been made and whether the number of retransmissions is less than or equal to the Retransmission limit. For example, the MFD may have an internal counter (Retransmission Counter) associated with a scan job, which is initially set to 1 for each new scan job. Later, in step 1760, each time the MFD retransmits the scan job, the Retransmission Counter is increased by 1. The Retransmission Counter may be a field associated with the scan job by the job manager. The Retransmission Limit may be a default parameter of the MFD or entered by a user via the MFD's user interface or through the MFD's Web service. The same Retransmission Limit may be used for all scan jobs of a MFD or it is also possible that a specific Retransmission Limit may be associated with each scan job. The Retransmission Limit may also be a field associated with the scan job by the job manager. For example, if the Retransmission Limit is 3, then the MFD will only attempt to retransmit the scan job a maximum of 3 times. Additionally, the retransmission limit may be stored in a non-volatile memory of the device.

In step 1730, the scan job is automatically reformatted by the Web services. For example, reformatting of scanned images may include ZIP file format compression, Mixed Raster Content (MRC) compression, Joint Bi-level Experts Group's JBIG2 compression, resolution conversion to lower resolutions, adjusting compression quality factors, changing color to grayscale, etc. Other data compression algorithms and image quality adjustments may be used as well. If a second or subsequent retransmission of the scan job is to be made, a different reformatting technique from the previous one(s) may be used. A default reformatting scheme (e.g., the sequence of reformatting techniques to be used) may also be used, or it may be entered by the user via the user interface of the MFD or the Web service.

In another embodiment, the Web service could query the scan destination for available storage space based on a compression ratio predictor that estimates the size of the compressed scan job, for example as disclosed in U.S. patent application Ser. No. 11/170,490 (U.S. Patent Application Publication No. 2007/0002391) as discussed above. Based on feedback from the scan destination the Web service could select a compression algorithm accordingly.

In step 1740, it is determined if the user had selected the electronic confirmation (EConfirmation) option. The electronic confirmation is an email sent to an email address of the user. The user's email address may been previously obtained as disclosed, for example, in method 900 (see FIG. 9), discussed above.

In step 1750, if EConfirmation is selected, then an electronic confirmation may be sent via email to the user, or sender. The electronic confirmation can be received by the user at any email enabled device, which may include, but is not limited to, a computer, a cellular phone, and a personal digital assistant. The email will indicate to the user that the MFD has attempted to retransmit the scan job a number of times, i.e., the retransmit limit, to no avail. Further, the email may notify the user of the compression techniques and/or schemes used. Also, a link may be provided in the email for the user to connect to the Web services of the MFD, as disclosed in method 1100 (see FIG. 11), discussed above.

In step 1760, the MFD retransmits of the scan job. At this point, the Retransmission Counter associated with a scan job is increased by 1. The method then returns to step 1710.

Systems and methods in accordance with an embodiment disclosed herein can advantageously protect highly sensitive and confidential data. Faxing and scanning productivity and system performance are improved by only having to scan documents once. User productivity is increased by no longer requiring the user to wait by the fax capable printer or multifunctional to receive a fax or scan transmission report. User productivity is also increased by allowing the user to reconfirm a fax destination address or scan detestation address, retransmit a job, reformat a job, or delete a job, using a Web browser.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

The claims can encompass embodiments in hardware, software, or a combination thereof.

What we claim is:

1. A method for automatically retransmitting a scan job from a device, comprising:
    scanning a document via the device;
    transmitting an electronic representation of the scanned document to a destination over a communication network as a scan job;
    automatically reformatting the scan job and retransmitting the reformatted scan job to the destination over the communication network, if the transmission fails;
    receiving an email address;
    receiving a scan destination address;
    generating a scan transmission report comprising a status of the scan job; and
    transmitting an email comprising the status of the scan job to the email address;
    wherein the email comprise a link to a Web service of the device and the scan destination address is stored in the link.

2. The method of claim 1, wherein transmitting the email comprising the status of the scan job to the email address, comprises at least one of: (a) embedding the scan transmission report in the body of the email; (b) attaching the scan transmission report as an attachment to the email; and (c) embedding a link to the scan transmission report in the body of the email.

3. The method of claim 1, wherein the scan destination address comprises a file storage address, an email address, or both.

4. The method of claim 1, wherein the email address comprises an email address for the user, a recipient, or both.

5. The method of claim 4, wherein receiving the email address for the user comprises obtaining the email address from a database according to login information entered by the user on a user interface of the device.

6. The method of claim 5, wherein the login information comprises a user ID and password.

7. The method of claim 1, wherein the Web service comprises at least one of: retrieving the scan destination address from the memory, displaying the scan destination address to user, allowing the user to edit the scan destination address, and retransmitting the scanned image to the scan destination address.

8. The method of claim 1, wherein the device allows a user to input a scan destination address which is stored in the memory.

9. The method of claim 1, wherein the transmission report details the compression techniques algorithms used and/or the number of retransmissions.

10. The method of claim 1, wherein reformatting the scan job comprises at least one from the group consisting of: (a) changing compression options for the scan job data, and (b) changing a scan parameter.

11. The method of claim 10, further comprising:
    querying or estimating the available storage space at the destination; and
    selecting a compression algorithm based on said query.

12. The method of claim 11, further comprising:
    using a different reformatting algorithm for a second or subsequent retransmission of the scan job.

13. The method of claim 12, further comprising:
    retransmitting the scan documents according to a default reformatting sequencing scheme.

14. The method of claim 12, further comprising:
    receiving a reformatting sequencing scheme from a user; and
    retransmitting the scan documents according to the scheme.

15. The method of claim 11, wherein the reformatting algorithm comprises one or more of: ZIP file format compression, Mixed Raster Content (MRC) compression, Joint Bi-level Experts Group's JBIG2 compression, resolution conversion to lower resolutions, adjusting compression quality factors, and changing color to grayscale.

16. The method of claim 11, wherein estimating the storage space at the destination comprises using a compressing ratio predictor.

17. The method of claim 1, further comprising keeping track of the number of retransmissions.

18. The method of claim 17, wherein retransmitting the reformatted scan job only occurs if the number of retransmissions is less than or equal to a retransmission limit.

19. The method of claim 1, further comprising:
    querying the status of the scan job on a regular basis.

20. A scanning device comprising:
    an image scanner configured to scan a document; and
    a job manager of the device, wherein the job manager is configured to: (a) transmit an electronic representation of the scanned document to a destination over a communication network as a scan job; and (b) automatically reformat the scan job and retransmit the reformatted scan job to the destination over the communication network, if the transmission fails;
    a user interface of the device, wherein the user interface receives an email address, receives a scan destination address, and receives a signal to scan a document;
    a scan service of the device;
    an email service of the device;
    a Web service;
    wherein the job manager (c) receives the email address, the scan destination address, and the signal to scan the document from the user interface, (d) transmits the document to the scan destination address as a scan job, (e) monitors the scan service for a status of the scan job, (f) generates a scan transmission report comprising the scan transmission status, and (g) transmits an email comprising the status of the scan job to the email address by sending the email address and the status of the scan job to the email service; and wherein the job manager places a link to the Web service of the device in the email; and wherein the scan destination address is stored in the link.

21. The system of claim 20, wherein the job manager (h) prints a scan transmission report.

22. The system of claim 20, wherein the Web service comprises at least one of: retrieving the scan destination address from the memory, displaying the scan destination address to user, allowing the user to edit the scan destination address, and retransmitting the scanned image to the scan destination address.

23. The system of claim 20, wherein the Web service comprises at least one of: displaying the scan job, displaying the status of the scan job, reformatting the scan job, and deleting the scan job.

24. The method of claim 23, wherein reformatting the scan job comprises at least one from the group consisting of: (a) changing compression options for the scan job data, and (b) changing a scan parameter.

25. The system of claim 20, further comprising a file transfer service of the device.

* * * * *